United States Patent [19]
Watanabe et al.

[11] Patent Number: 4,736,224
[45] Date of Patent: Apr. 5, 1988

[54] METHOD OF AND APPARATUS FOR DETERMINING FRAME POSITION

[75] Inventors: Izumi Watanabe; Keiichi Yamana, both of Kanagawa, Japan

[73] Assignee: Fuji Photo Film Co., Ltd., Kanagawa, Japan

[21] Appl. No.: 937,633

[22] Filed: Dec. 3, 1986

[30] Foreign Application Priority Data

Dec. 4, 1985 [JP] Japan .................................. 60-273014

[51] Int. Cl.⁴ ............................................ G03B 27/52
[52] U.S. Cl. ........................................ 355/41; 355/45; 355/77; 250/557; 250/561
[58] Field of Search ........................ 355/40, 41, 45, 77; 250/557, 561, 571; 353/26 A

[56] References Cited
U.S. PATENT DOCUMENTS 4,457,008 6/1984 Nakatani et al. .................. 355/41 X Primary Examiner—L. T. Hix
Assistant Examiner—D. Rutledge
Attorney, Agent, or Firm—Sughrue, Mion, Zinn, Macpeak & Seas

[57] ABSTRACT

A method of determining the position of a particular frame on a film being moved in its longitudinal direction, the film having blip marks provided thereon for respective frames in advance. In this method, no detection of blip marks is effected during a period of time which begins immediately after the leading end edge of a blip mark has been detected and which ends slightly before the time at which the leading end edge of a subsequent blip mark is expected to be detected. Accordingly, there is no fear of dust attached to the film being misjudged to be a blip mark. Also disclosed is an apparatus which may suitably be employed to carry out the above-described method.

10 Claims, 24 Drawing Sheets

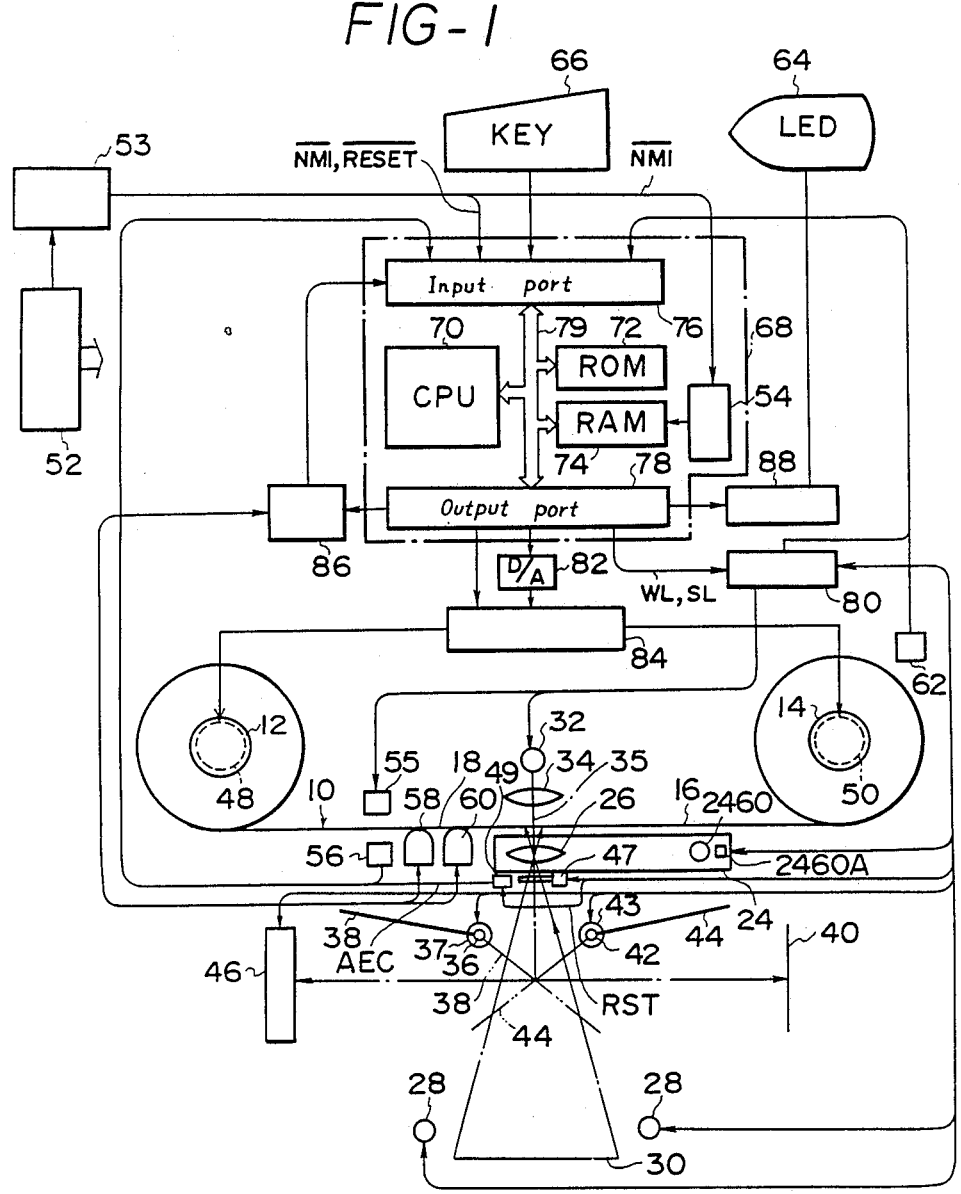

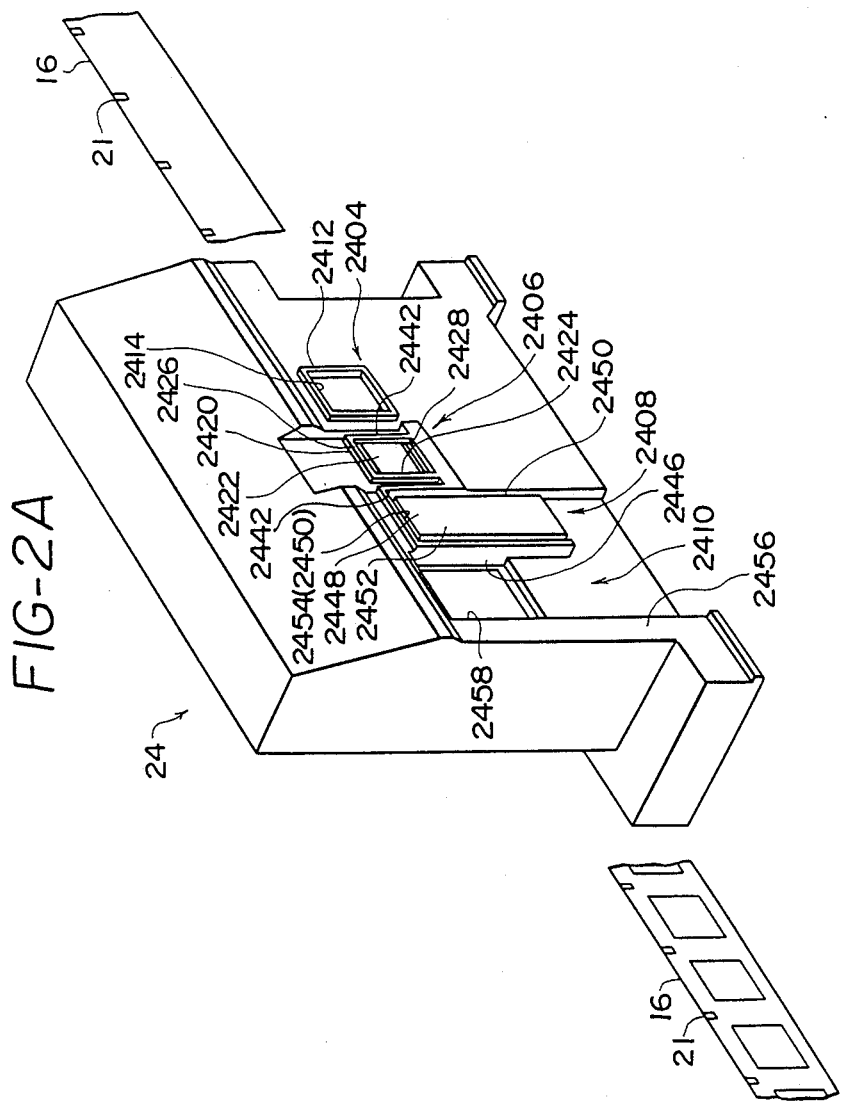

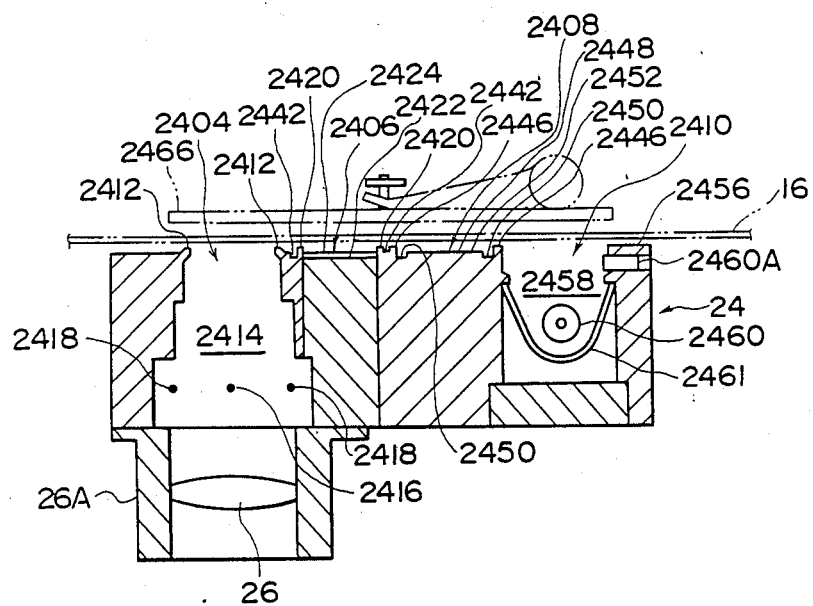

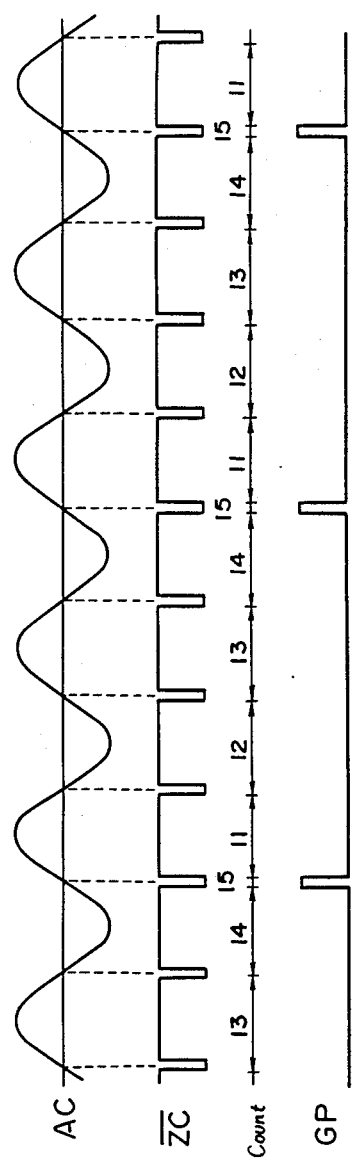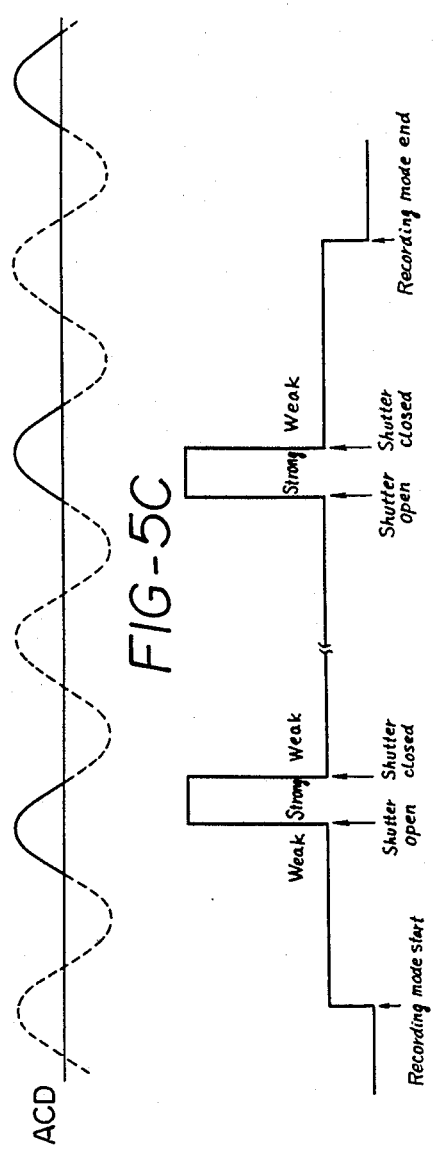

FIG-10A

| L | 1 | 2 | END |
|---|---|---|---|
| F(folder) | 100 | 200 | |

FIG-10B

| | 4 | 15 | END |
|---|---|---|---|
| Unfixed frame address | | | |

FIG-11

| A | 0 | 5 | 10 | 15 | 20 | 25 | 30 | 35 | 40 | 45 | 50 | 55 | 60 | 65 | 70 | 75 | 80 |
|---|---|---|---|---|---|---|---|---|---|---|---|---|---|---|---|---|---|
| F J P | F | P | P | J | P | P | P | J | P | P | F | P | J | P | J | P | END |
| Absolute address | 1 | 2 | 3 | 4 | 5 | 1000 | 6 | 13 | 14 | 15 | 7 | 8 | 9 | 10 | 11 | 12 | 16 |

| C | F J P | M | S |  |  |  |
|---|---|---|---|---|---|---|
| | | Absolute address | | | | |
| | | File mark | | | | |

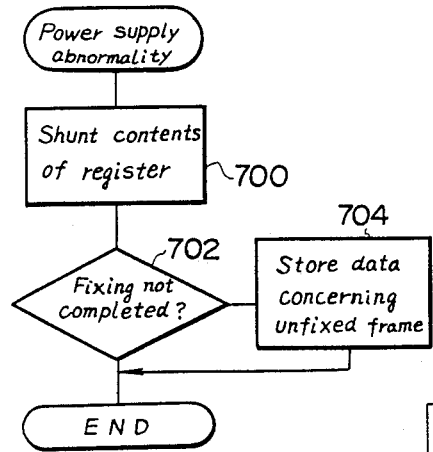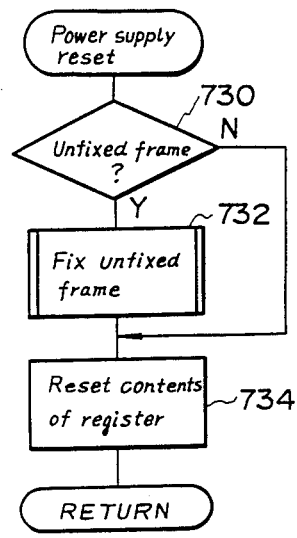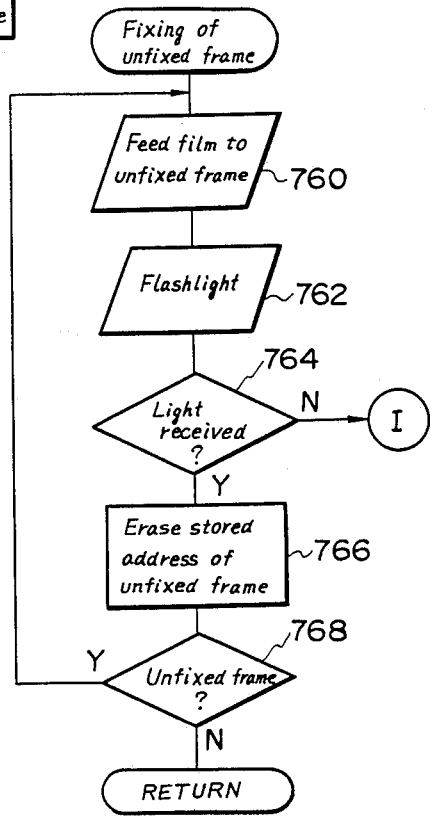

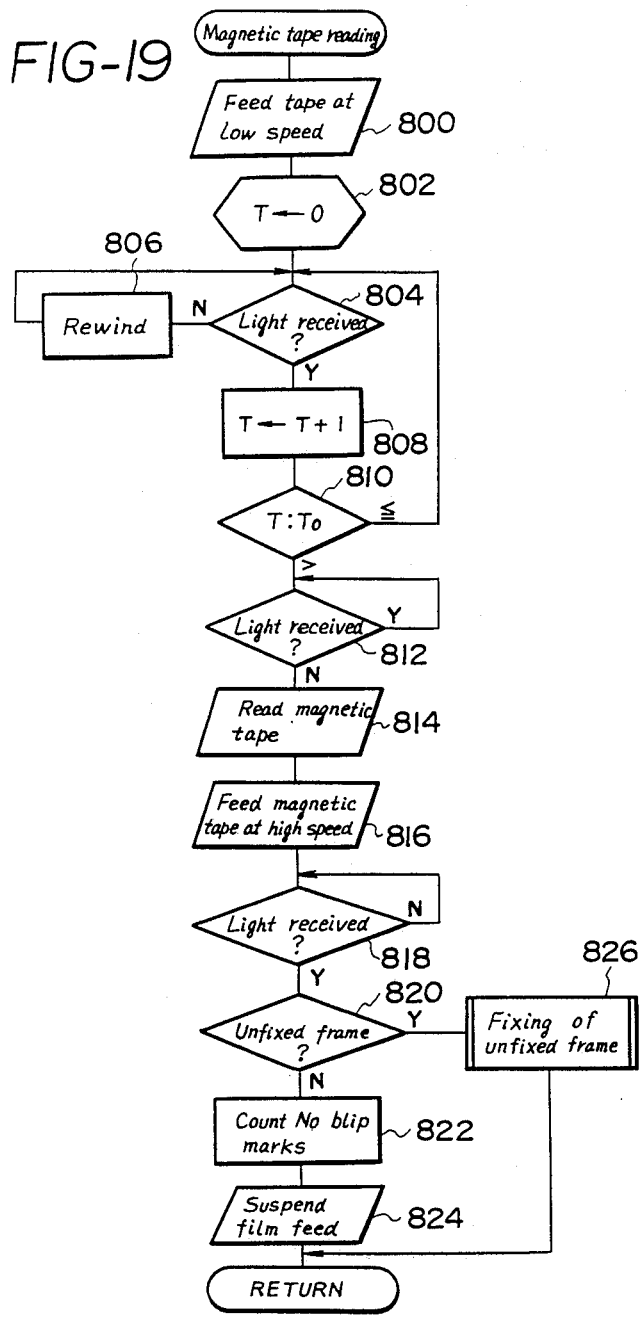

METHOD OF AND APPARATUS FOR DETERMINING FRAME POSITION

BACKGROUND OF THE INVENTION

1. Field of the Invention

The present invention relates to a method of determining the position of a particular frame on a film by detection of blip marks provided for respective frames on the film in advance. The present invention also pertains to an apparatus which may suitably be employed for carrying out said method.

2. Description of the Related Art

In the conventional frame position determining system of the type described above, it is necessary, in order to increase the degree of accuracy in suspending the feed of a film, to determine a blip mark immediately when detecting a rise of a pulse of a blip mark detecting signal, and this involves the problem that dust which is attached to the surface of a film is misjudged to be a blip mark. To overcome such disadvantage, a system has already been devised in which a blip mark is discriminated from dust by detecting blip mark at two positions.

In U.S. Pat. Nos. 3,802,771 and 3,629,840, for example, such a system has been proposed that the blip mark is detected by arrangement of a plurality of blip mark detectors.

The above-described conventional system, however, needs to provide blip mark detectors at two positions, respectively, which means that the number of input and output devices is increased and the arrangement of the apparatus is complicated, disadvantageously.

Also, an image data processing system to which the present invention is suitably applied has been proposed in U.S. application Ser. No. 884,344.

SUMMARY OF THE INVENTION

In view of the above-described circumstances, it is an object of the present invention to provide a frame position determining method which enables an increase in the degree of accuracy in suspending the feed of a film with a simplified arrangement and which permits prevention of occurrence of misjudgement.

It is another object of the present invention to provide an apparatus which may suitably be employed to carry out said frame position determining method.

To these ends, the present invention provides a frame position determining method comprising the steps of: moving a film in its longitudinal direction, the film having blip marks provided thereon for respective frames in advance; and detecting blip marks to determine the position of a particular frame on the film in such a manner that no detection of blip marks is effected during a period of time which begins immediately after the leading end edge of a blip mark has been detected and which ends slightly before the time at which the leading end edge of a subsequent blip mark is expected to be detected.

To carry out the above-described method, the present invention provides an apparatus which comprises: film feed means rotating two reels having a film wound thereon, the film having blip marks provided thereon at a predetermined regular spacing; a photosensor defined by a combination of light-emitting and -receiving elements disposed so as to face each other across the film; and means for determining the position of a particular frame by detecting blip marks through the photosensor in such a manner that no detection of blip marks is effected during a period of time which begins immediately after the leading end edge of a blip mark has been detected and which ends slightly before the time at which the leading end edge of a subsequent blip mark is expected to be detected.

Thus, according to the present invention, no detection of blip marks is effected during a predetermined period after the leading end edge of a blip mark has been detected, e.g., until the value of film moving speed integrated with time reaches a predetermined value. Accordingly, there is no fear of dust attached to the film being misjudged to be a blip mark during said period, and it is therefore possible to increase the degree of accurac in suspending the feed of the film with a relatively simple arrangement.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 1 schematically shows the arrangement of an image data processing system to which the present invention is applied;

FIGS. 2A and 2B show in combination the arrangement of the processing head employed in the processing system;

FIG. 5B is a time chart showing the operation of the AC power control circuit;

FIG. 5C is a time chart showing the lighting control of a halogen lamp employed in the processing system;

FIG. 10A shows a folder table;

FIG. 10B shows an addess table for unfixed frames;

FIG. 11 shows an address table used to obtain absolute addresses;

FIG. 12 shows a memory map showing the arrangement of frame data for one frame;

FIGS. 18A to 18C are flowcharts showing operations conducted when the power supply has a failure and when it is restored to a normal state;

FIG. 19 is a flowchart showing a magnetic tape reading operation; and

DESCRIPTION OF THE PREFERRED EMBODIMENTS

Figure 3:
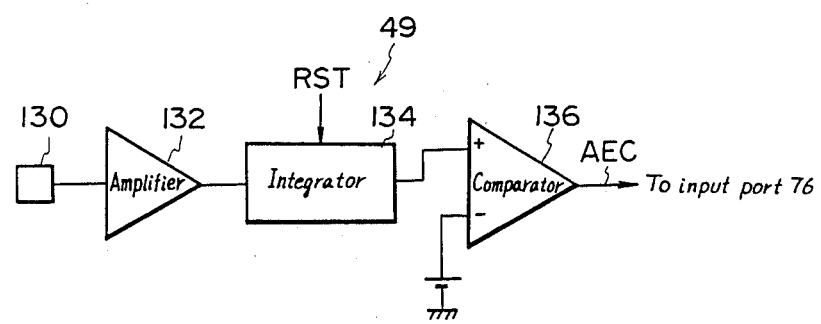
FIG. 3 is a block diagram of the exposure detector employed in the processing system.

The arrangement of an image data processing system to which the present invention is applied will first be described below in broad outline.

FIG. 1 shows the arrangement of one preferred embodiment of the present invention. In this embodiment, the image of a document 30 is recorded on an electrophotographic film 16, and an image which has already been recorded on the film 16 is projected on a screen 40 or copied by a copying device 46.

One end of a tape 10 which defines an image data recording medium is secured to a take-up shaft 12, and the other end of the tape 10 is secured to another take-up shaft 14. The arrangement is such that the tape 10 wound up on the take-up shaft 14 is unwound and wound up on the take-up shaft 12.

Figures 8, 9:
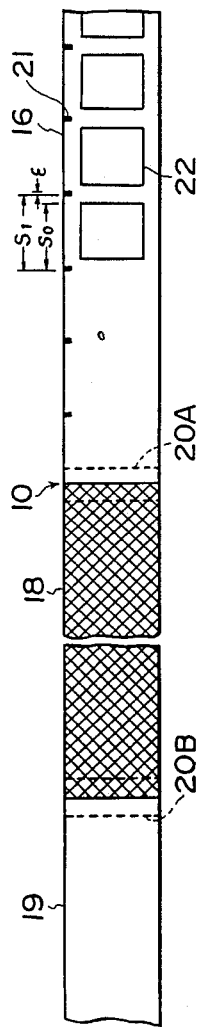
FIG. 8 is a fragmentary front view of a leader tape, a magnetic tape and an electrophotographic film which are spliced together.
FIG. 9 is a frame data table showing one example of frame data in which each relative address has a two-stratum structure.

The tape 10 is, as shown in FIG. 8, composed of an electrophotographic film 16, a magnetic tape 18 and a transparent leader tape 19 which are connected together in such a manner that the film 16 and the magnetic tape 18 are spliced by means of a piece of adhesive tape 20A and the tape 18 and the leader tape 19 are spliced by a piece of adhesive tape 20B. Blip marks 21 are printed in advance on the upper edge of the film 16 at a predetermined regular spacing, so that the absolute address of a particular frame can be obtained by counting the number of blip marks 21. A frame image 22 is recorded in an area between each pair of adjacent blip marks 21. The frame images 22 are not always necessary to record consecutively and may be recorded at any desired positions which are spaced apart from each other as desired.

Referring back to FIG. 1, a processing head 24 is disposed in opposing relation to the electrophotographic film 16 so that frame images 22 (see FIG. 8) are recorded on the film 16 through charging, light exposure, development, drying and fixing operations effected by the processing head 24. The head 24 has a lens 26 and is arranged such that the light from an illuminating light source 28 consisting of two light source elements is reflected from a document 30 and passed through the lens 26, and the image of the document 30 is thereby formed on the film 16 through the lens 26 to effect light exposure.

As shown in FIG. 1, a projecting light source 32 and a lens 34 are provided on the side of the film 16 which is remote from the processing head 24, the light source 32 and the lens 34 being disposed on the optical axis 35 of the lens 26.

It should be noted that FIG. 1 schematically shows the arrangement of the system and, in practice, a mirror is disposed between the lens 34 and the tape 10 to bend the optical path in the vertical direction of the system and the lens 34 and the projecting light source 32 are also disposed on the bent optical axis, whereby a tape 10 which is accommodated in a cassette can be used.

Between the document 30 and the processing head 24 is disposed a mirror 38 which is pivoted about a shaft 36 by means of a motor 37. Any one of the frame images 22 recorded on the film 16 can be formed on the screen 40 in such a manner that the light from the projecting light source 32 is passed through the lens 34, the film 16 and the lens 26 and reflected by the mirror 38 so as to be projected on the screen 40. Another mirror 44 is disposed on the side of the optical axis 35 which is remote from the mirror 38, the mirror 44 being adapted to be pivoted about a shaft 42 by means of a motor 43. Thus, any one of the frame images 22 recorded on the film 16 can be copied on a sheet of copying paper (not shown) in the copying device 46 in such a manner that the light from the projecting light source 32 is passed through the lens 34, the film 16 and the lens 26 and reflected by the mirror 44, thereby allowing a particular frame image 22 recorded on the film 16 to be copied on the copying paper.

A shutter 47 is disposed on the side of the processing head 24 which is closer to the document 30. The shutter 47 is employed before and after a recording operation to intercept the reflected light from the document 30 illuminated with the illuminating light source 28, and the shutter 47 shuts out the light from the projecting light source 32 when the electrophotographic film 16 is being fed in the retrieval/projecting mode. In addition, an exposure detector 49 is disposed in the vicinity of the shutter 47 to detect a correct exposure when recording is effected.

The take-up shaft 12 is rotated by a motor 48, and the take-up shaft 14 is rotated by a motor 50. A light-emitting element 55 and a light-receiving element 56 are disposed in opposing relation to each other across the tape 10 so as to detect blip marks 21. In addition, a recording and reproducing head 60 and an erasing head 58 are provided for the magnetic tape 18 of the tape 10 so as to record, reproduce or erase frame data.

A cassette loading detector 62 is disposed in this image data processing system to detect the fact that a cassette accommodating the electrophotographic film 16 is loaded on the system. Further, the operator actuates the keys on a control keyboard 66 while viewing the display on an LED display 64 to operate this system and input data therein.

Calculation and control required for the operation of this system are effected by a microcomputer 68. The microcomputer 68 has a CPU 70, a ROM 72, a RAM 74, an input port 76, an output port 78, and a bus 79 for connecting these members.

A power circuit 52 serves as a power source for supplying necessary electric power to each of the above-described devices. The power circuit 52 is connected to a commercial AC power supply. A power interruption detecting circuit 53 is adapted to detect a momentary interruption and a stoppage of this alternating current and supply a power off signal to a battery back-up circuit 54 when detecting such emergency situation in order to switch the power source for supplying current to the RAM 74 from the power circuit 52 to a battery, thereby securely holding the contents stored in the RAM 74.

To the input port 76 are connected the exposure detector 49, the power interruption detecting circuit 53, the light-receiving element 56, the cassette loading detector 62 and the control keyboard 66 to supply the input port 76 with a correct exposure signal from the exposure detector 49, a power off signal from the power interruption detecting circuit 53, and a signal from the light-receiving element 56 which represents the fact that light is intercepted by the magnetic tape 18 or a blip mark 21. The input port 76 is further supplied with a lamp burnout signal through a driver circuit 80 from a light-receiving element 2460A disposed near a xenon lamp 2460, and a reproducing signal from the recording and reproducing head 60 through a magnetic tape interface 86. The lamp burnout signal is generated and supplied when the light-receiving element 2460A receives no light within a predetermined period of time after the driver circuit 80 has supplied a drive signal to the xenon lamp 2460 so as to be turned on.

The output port 78 is connected through the driver circuit 80 with the processing head 24, the illuminating light source 28, the projecting light source 32, the motors 37, 43, the copying device 46, the shutter 47, the exposure detector 49, and the light-emitting element 55. Thus, the processing head 24 is controlled so as to effect charging, light exposure, drying and fixing operations. During an exposure operation, the illuminating light source 28 is turned on, whereas, during a projecting or copying operation, the motor 37 or 43 is rotated to pivot the mirror 38 or 44 and the projecting light source 32 is turned on. During a recording or projecting operation, the shutter 47 is opened and, at this time, the exposure detector 49 is reset, and while the motor 48 or 50 is being rotated, the light-emitting element 55 is turned on. The motors 48 and 50 are connected to the output port 78 through a D/A converter 82 and a driver circuit 84, so that the rotational speed of the motor 48 or 50 is controlled in a multiplicity of steps immediately after starting or immediately before stopping the operation of the motor. The output port 78 is further connected with the recording and reproducing head 60 and the erasing head 58 through the magnetic tape interface 86, so that, when recording is effected, an erasing signal is supplied to the erasing head 58 and a recording signal is supplied to the recording and reproducing head 60. In addition, the output port 78 is connected with the LED display 64 through a driver circuit 88, so that a display signal is supplied to the LED display 64.

Figure 6:
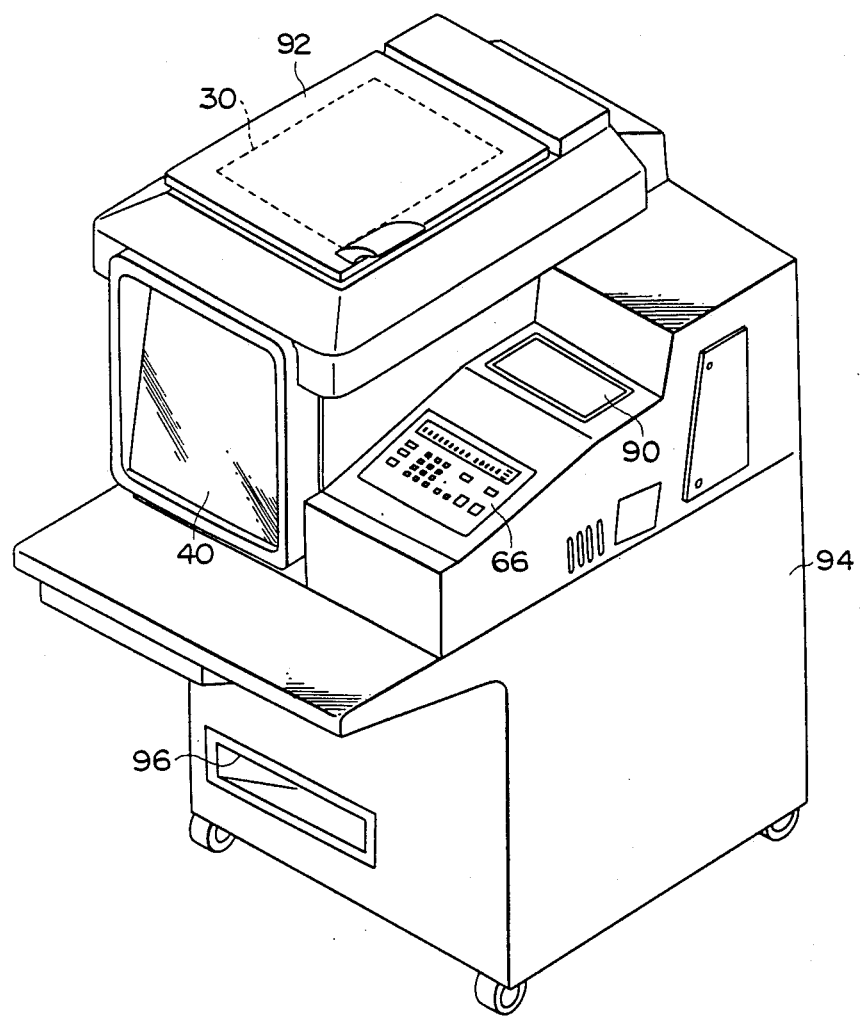
FIG. 6 is a perspective view showing the external appearance of the image data processing system illustrated in FIG. 1

FIG. 6 is a perspective view showing the external appearance of the processing system, arranged as detailed above. In this system, a cassette is loaded into a cassette loading section 90, and the image of a document 30 pressed by a document pressing white plate 92 is recorded on an electrophotographic film accommodated in the cassette. The recorded image may be projected on the screen 40, or the image may be copied by the copying device 46 incorporated in a housing 94, and a copy of the image is taken out of an opening 96 provided in the housing 94. These processing operations are carried out in accordance with the key input control effected from the control keyboard 66.

A practical example of the processing head 24 will be explained below in detail.

Referring to FIGS. 2A and 2B, the processing head 24 has a charging exposure section 2404, a developing section 2406, a drying section 2408 and a fixing section 2410.

The charging exposure section 2404 is provided with a projecting frame 2412 which is adapted to contact right and left edges of each frame on the electrophotographic film 16. A charging exposure chamber 2414 is defined by a space which extends through the section 2404 horizontally (from the top to the bottom as viewed in FIG. 2B). In the charging exposure chamber 2414 are disposed a corona wire 2416 and corona electrodes 2418 which are respectively positioned on both sides of the wire 2416, the wire 2416 and the electrodes 2418 extending vertically (in a direction parallel to the longitudinal axes of the frame 2412). The lens 26 is mounted on the processing head 24 through a lens tube 26A at the side opposite to the frame 2412 of the charging exposure chamber 2414. It should be noted that the optical axis of the lens 26 is coincident with the center between the projecting frame 2412.

The developing section 2406 is provided with a projecting frame 2420 in such a manner that the width of an opening defined by the frame 2420 is slightly smaller than the width of an opening defined by the projecting frame 2412. A developing electrode 2422 made from a metal sheet is disposed inside the frame 2420 in such a manner that the outer surface of the electrode 2422 is located at a position which is slightly inner than the distal end of the frame 2420. The space surrounded by the frame 2420 and the developing electrode 2422 defines a developing chamber 2424. An opening is provided between the upper edge of the electrode 2422 and the frame 2420 to define a developer inlet 2426, and another opening is provided between the lower edge of the electrode 2422 and the frame 2420 to define a developer outlet 2428, the length of the inlet 2426 and the outlet 2428 being equal to the width of the electrode 2422.

The developer inlet 2426 is communicated with a developer supply tank (not shown), and a predetermined amount of a developer is supplied to the developing chamber 2424 through the developer inlet 2426 during a developing operation. The developer is formed by dispersing finely-divided toner particles in a solvent, and a charging adjusting agent is added to the developer so that the toner particles are readily charged negative. The developer outlet 2428 is communicated with a developer receiving tank (not shown). The arrangement is such that the developer is circulated between the the developer receiving tank and the developer supply tank by means of a known pump. In addition, pumped air is discharged from the developer inlet 2426 when a developing operation for a single frame is completed, so that the developer after the development is quickly and smoothly discharged from the developer outlet 2428.

Recesses 2442 are respectively formed on the outer sides of the projecting frame 2420. Each recess 2442 is partially opened and communicated with a known evacuating mechanism such as a suction pump so that each recess 2442 serves to suck the developer leaking out from the developing chamber 2424. It should be noted that pipes which connect together various devices are not shown in FIGS. 2A and 2B.

The drying section 2408 is provided with a projecting frame 2446. The frame 2446 consists of an upper frame member and right and left frame members. The width of an opening defined by the frame 2446 is set so as to be slightly larger than the width of the opening defined by the projecting frame 2412. A wall 2448 is formed inside the frame 2446 in such a manner that the surface of the wall 2448 is located at a position which is slightly inner than the distal end of the frame 2446. A U-shaped recess 2450 is defined between the wall 2448 and the frame 2446. The space surrounded by the frame 2446, the wall 2448 and the recess 2450 defines a drying chamber 2452. An opening is formed in a portion of the recess 2450 which is located at the upper side of the wall 2448, so as to provide a warm air outlet 2454.

The fixing section 2410 is defined by the left frame member of the frame 2446 and a projecting wall 2456 which is provided at the left-hand (as viewed in FIG. 2A) end of the processing head 24. The space in the section 2410 defines a fixing chamber 2458. The xenon lamp 2460, serving as a flash lamp, and a reflecting plate 2461 therefor are disposed in the fixing chamber 2458, so that an image is thermally fixed to the surface of the electrophotographic film 16 by means of flashlight applied from the xenon lamp 2460. The width of opening of the fixing chamber 2458 is set such as to be wider than that of the drying chamber 2452.

It should be noted that the respective distal ends of the projecting frames 2412, 2420 and 2446 are flush with each other. In addition, the positional relationship between the the charging exposure chamber 2414, the developing chamber 2424, the drying chamber 2452 and the fixing chamber 2458 is so set that four consecutive frames of the film 16 can face these chambers, respectively, at the same time.

As shown in FIG. 2B, a pressing plate 2466 is disposed in opposing relation to the front surface of the processing head 24. The pressing plate 2466 is adapted to press the electrophotographic film 16 against the processing head 24, thereby accurately positioning the film 16 and enabling the film 16 and the head 24 to be in close contact with each other in a satisfactory way. When the film 16 is moved, it is released from the pressing effected by the plate 2466.

The operation of the exposure detector 49 will be described below in detail with reference to FIG. 3.

The reflected light from the document 30 is received by a light receiver 130 and supplied to an amplifier 132 which, in turn, supplies a voltage proportional to the amount of received light to an integrator 134. The integrator 134 integrates the supplied voltage and supplies the result of integration to the non-inverting input terminal of a comparator 136. In the integrator 134, the integrated value is reset when a shutter open signal is supplied to the shutter 47.

Accordingly, when, during a recording operation, a correct exposure is reached after the shutter 47 has been opened, a high (H)-level signal is output from the comparator 136 and supplied to the input port 76. This high-level signal is defined as an automatic exposure control signal AEC. Processing of the signal AEC effected by the microcomputer 68 will be described later.

Figure 4:
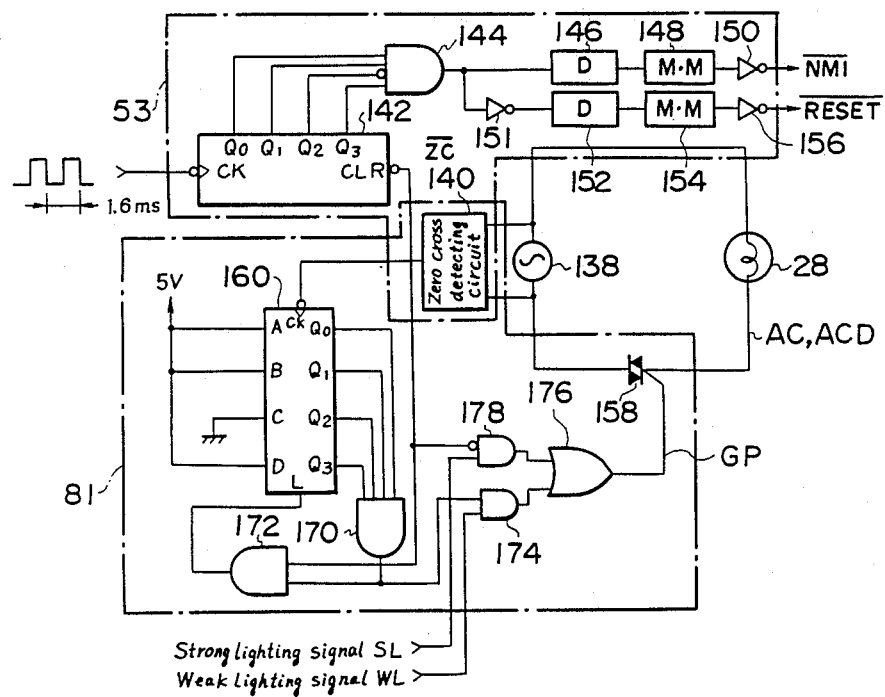
FIG. 4 shows the power interruption detecting circuit and AC power control circuit employed in the processing system.
Figure 5A:
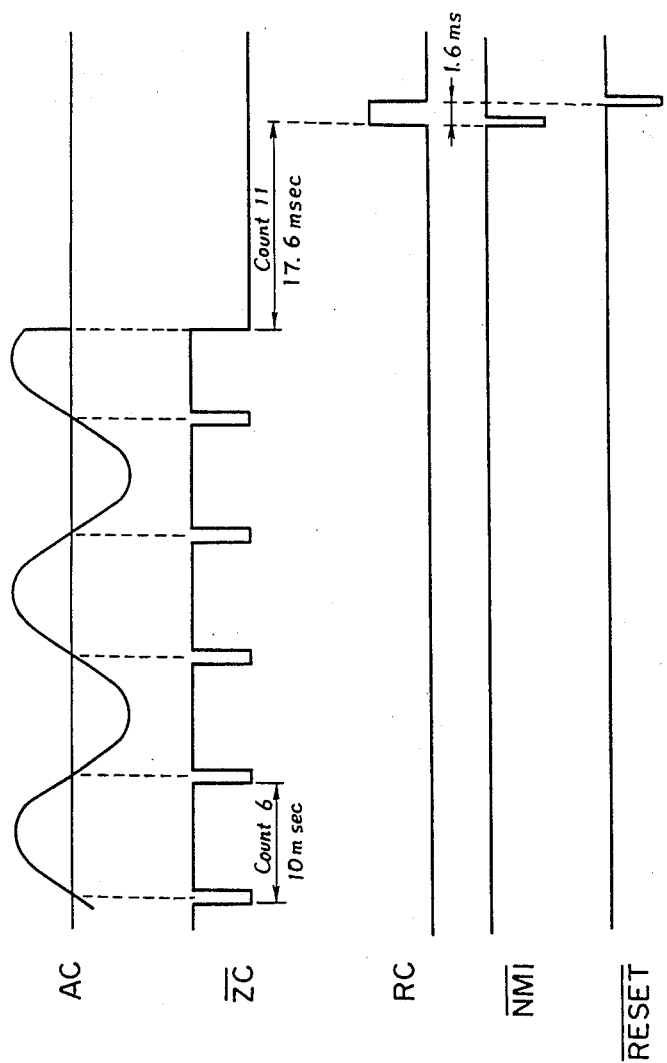
FIG. 5A is a time chart showing the operation of the power interruption detecting circuit.

The following is a description of the operation of the power interruption detecting circuit 53 with reference to FIGS. 4 and 5A.

A zero cross point (see FIG. 5A) of the AC voltage supplied from a commercial AC power supply 138 is detected by a zero cross detecting circuit 140, and a zero cross signal $\overline{ZC}$ (see FIG. 5A) is supplied to a clear terminal of an up counter 142. The up counter 142 is cleared of its count and allowed to resume counting the number of pulses which define a clock signal CK in response to a fall of the zero cross signal $\overline{ZC}$. The clock signal CK is formed by frequency-dividing a clock signal employed in the CPU 70, the period of the signal CK being 1.6 msec in this embodiment (see FIG. 4). When the count of the up counter 142 reaches 11, the output RC of an AND gate 144 is raised to the H level. The output RC is differentiated by a differentiating circuit 146 to detect a rise thereof, shaped by a monostable multivibrator 148, inverted by an inverter 150 and supplied as a non-maskable interrupt signal $\overline{NMI}$ (see FIG. 5A) to the input port 76 and the battery back-up circuit 54, which are shown in FIG. 1.

Accordingly, the non-maskable interrupt signal $\overline{NMI}$ is output from the power interruption detecting circuit 53 if no subsequent zero cross signal $\overline{ZC}$ is supplied to the up counter 142 even when $1.6 \times 11 = 17.6$ msec has elapsed after a zero cross point of the voltage supplied from the AC power supply 138 has been detected. Normally, the negative pulse period of the zero cross signal $\overline{ZC}$ is 10 msec, and the up counter 142 is cleared when the count reaches 6; therefore, no non-maskable interrupt signal $\overline{NMI}$ is output.

The output signal RC from the AND gate 144 is also supplied to a differentiating circuit 152 through an inverter 151 to detect a rise of the signal RC, that is, a point of time at which the count of the up counter 142 reaches 12. The output of the differentiating circuit 152 is shaped by a monostable multivibrator 154, inverted by an inverter 156, and then supplied as a reset signal $\overline{RESET}$ (see FIG. 5A) to the input port 76 shown in FIG. 1.

Accordingly, when 1.6 msec has elapsed after the nonmaskable interrupt signal $\overline{NMI}$ has been output, the reset signal $\overline{RESET}$ is output. This signal $\overline{RESET}$ is an interrupt signal applied to the CPU 70.

Processing of the non-maskable interrupt signal $\overline{NMI}$ and the reset signal $\overline{RESET}$ will be explained later in detail.

The following is a description of the operation of an AC power control circuit 81 which is a constituent element of the driver circuit 80 with reference to FIGS. 4 and 5B.

The AC power control circuit 81 controls the electric power supplied to the illuminating light source 28 so that the power is selectively set at two levels, i.e., high and low levels. For this purpose, the circuit 81 employs a triac 158. In this embodiment, each constituent element of the illuminating light source 28 is defined by a halogen lamp, which has the characteristics that the quantity of light emitted therefrom is stable and the lifetime is advantageously long.

A preset up counter 160 counts the number of falls of pulses defining the zero cross signal $\overline{ZC}$ (see FIG. 5B) from the zero cross detecting circuit 140. The preset count of the up counter 160 is determined by voltages at intput terminals A, B, C and D, and it is 11 in this embodiment. The count value is set in response to a rise of the output (preset signal) from an AND gate 172. More specifically, when the count of the preset up counter 160 reaches 15 (the zero cross signal $\overline{ZC}$ at this time is at a low (L) level), the output of an AND gate 170 is raised to the H level, and the AND gate 172 is opened. Then, when the zero cross signal $\overline{ZC}$ is raised to the H level, a preset signal is input to the up counter 160 through the AND gate 172, and the count of the counter 160 is preset at 11.

Accordingly, the output of the AND gate 170 is raised to the H level only when the count of negative pulses of the zero cross signal $\overline{ZC}$ reaches 15 and the zero cross signal $\overline{ZC}$ is at the L level. When a weak lighting signal WL from the output port 78 which is shown in FIG. 1 is raised to the H level, the AND gate 174 is opened, and the H-level output from the AND gate 170 is supplied through the AND gate 174 and an OR gate 176 to the triac 158 as a gate pulse signal GP (see FIG. 5B), whereby the triac 158 is turned or fired at the zero cross point. In consequence, the alternating current flows through the illuminating light source 28 only during one half cylce in two AC cycles (see ACD in FIG. 5B), and the light source 28 is therefore supplied with ¼ of the electric energy supplied when the triac 158 is shorted. Since the triac 158 is fired at the zero cross point, there is no fear of any noise being generated in other circuits.

When a strong lighting signal SL from the output port 78 is raised to the H level, an AND gate 178 is opened, and the zero cross signal $\overline{ZC}$ is supplied to the triac 158 through the AND gate 178 and the OR gate 176. In consequence, the triac 158 is fired every time the alternating current crosses the zero point, and the current therefore flows through the illuminating light source 28 during both halves of each AC cycle. Thus, the electric power supplied to the illuminating light source 28 can be controlled so as to be selectively set at two levels in response to the strong lighting signal SL and the weak lighting signal WL without generating any noise. This lighting control will be explained late in detail.

It should be noted that the electric power supplied to the illuminating light source 28 can be reduced to 1/n (n is a natural number) of that in the case of a strong lighting mode by changing the preset value for the preset up counter 160. Therefore, an arrangement may be adopted wherein the value for the preset up counter 160 is made variable and supplied from the microcomputer 68 rather than through the gates 174, 176 and 178, and the output of the AND gate 178 is supplied directly to the gate of the triac 158. The AC power control circuit 81 can also be applied to a case where the load is a heater, e.g., in the case of a thermal developing apparatus, a heat transfer apparatus, etc., because the control circuit 81 involves substantially no heat variations in the load.

Figure 7:
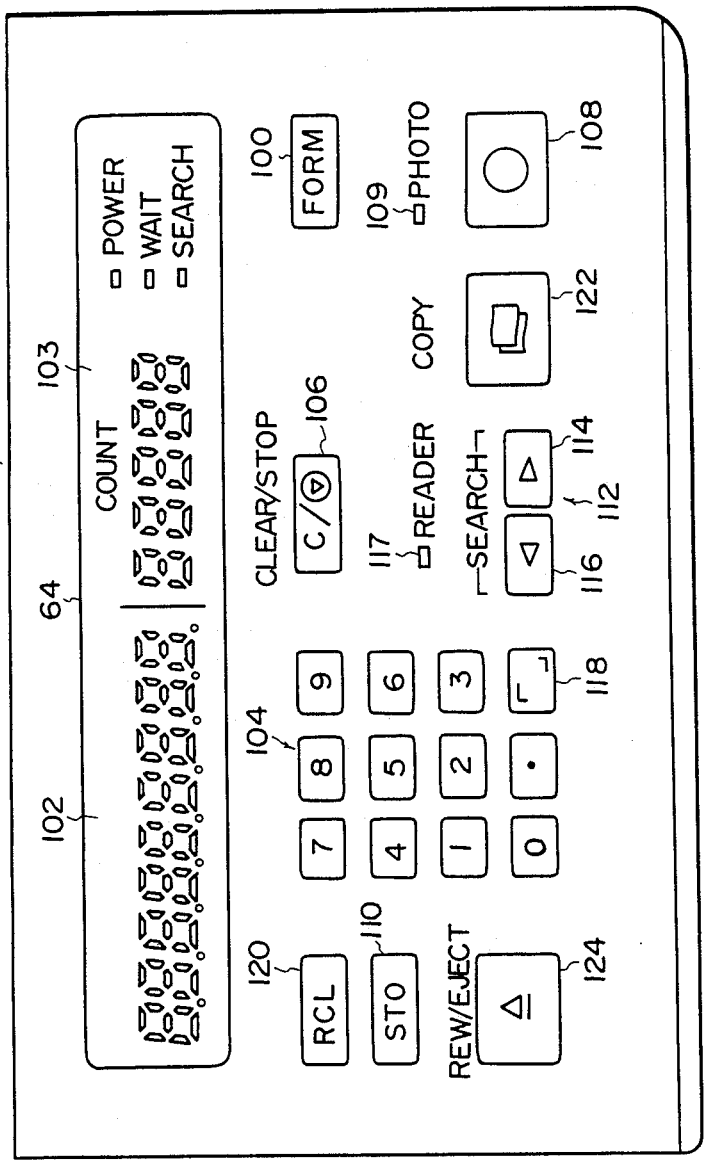
FIG. 7 is an enlarged detailed view of the control keyboard shown in FIG. 6.
Figure 13A:
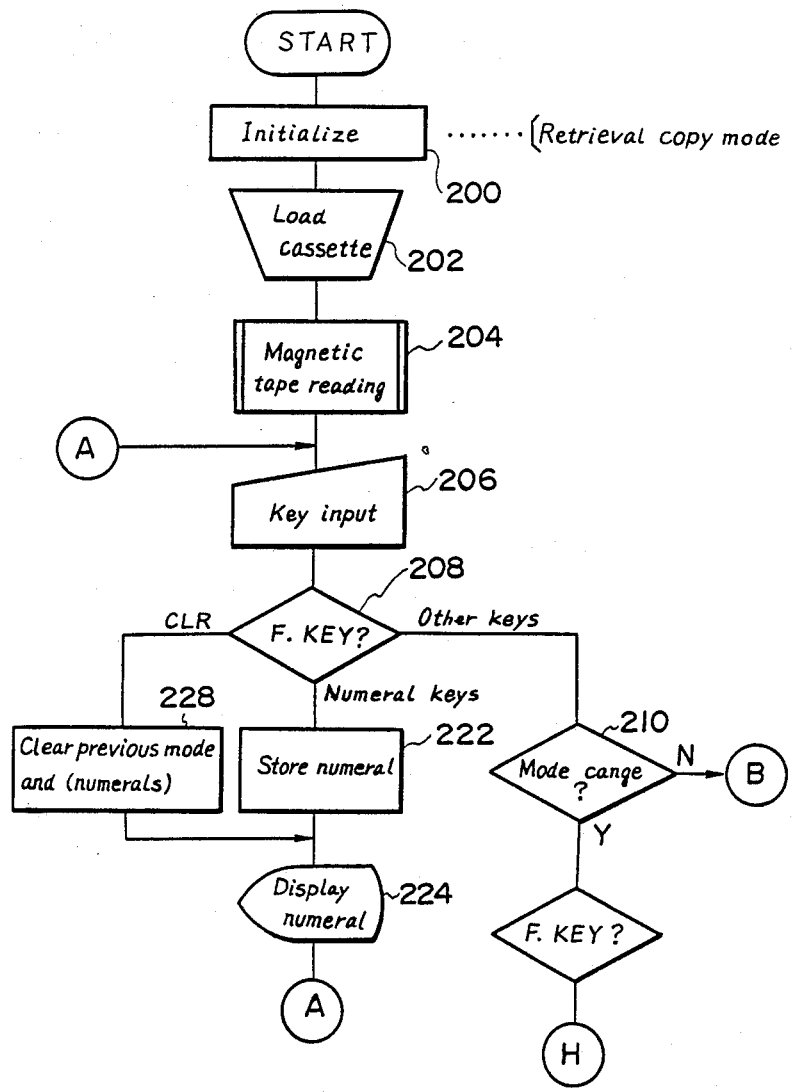
FIGS. 13A to 13C are flowcharts schematically showing the registration of folder, recording, retrieval and copying.
Figure 13B:
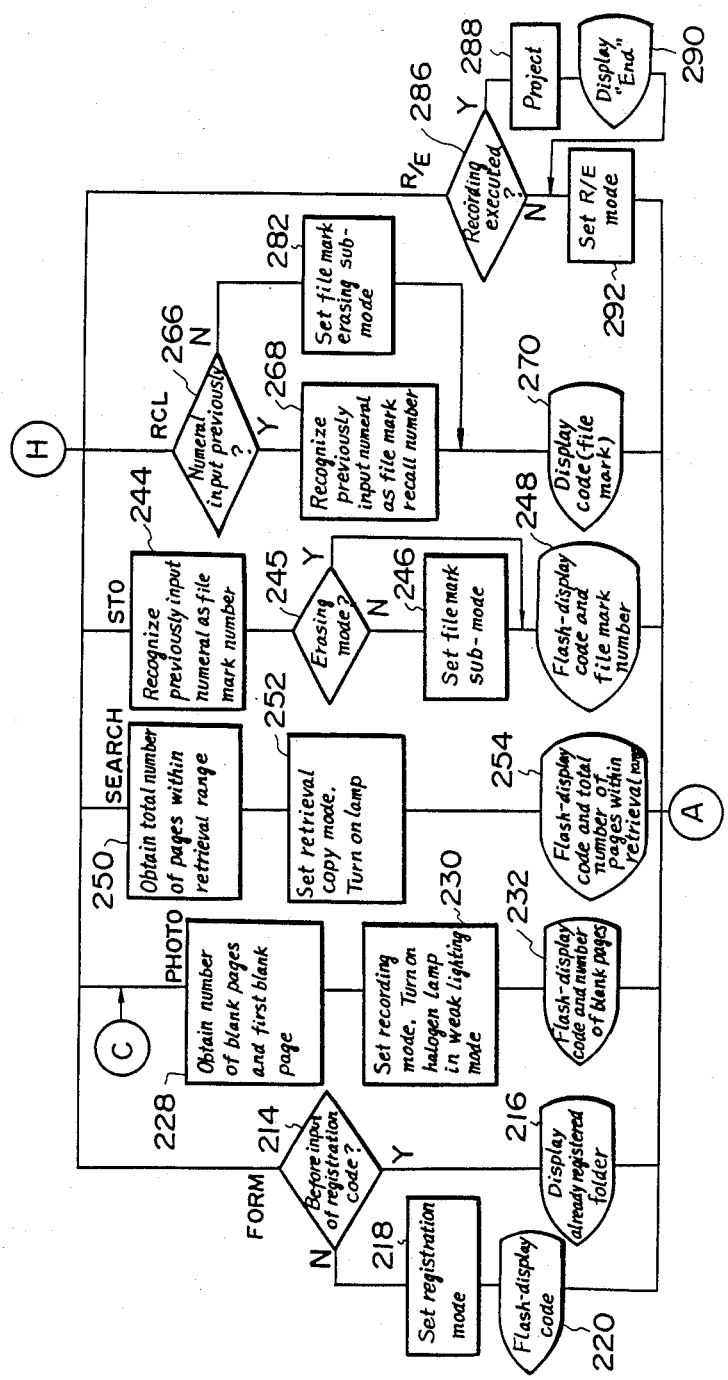
Figure 13C:
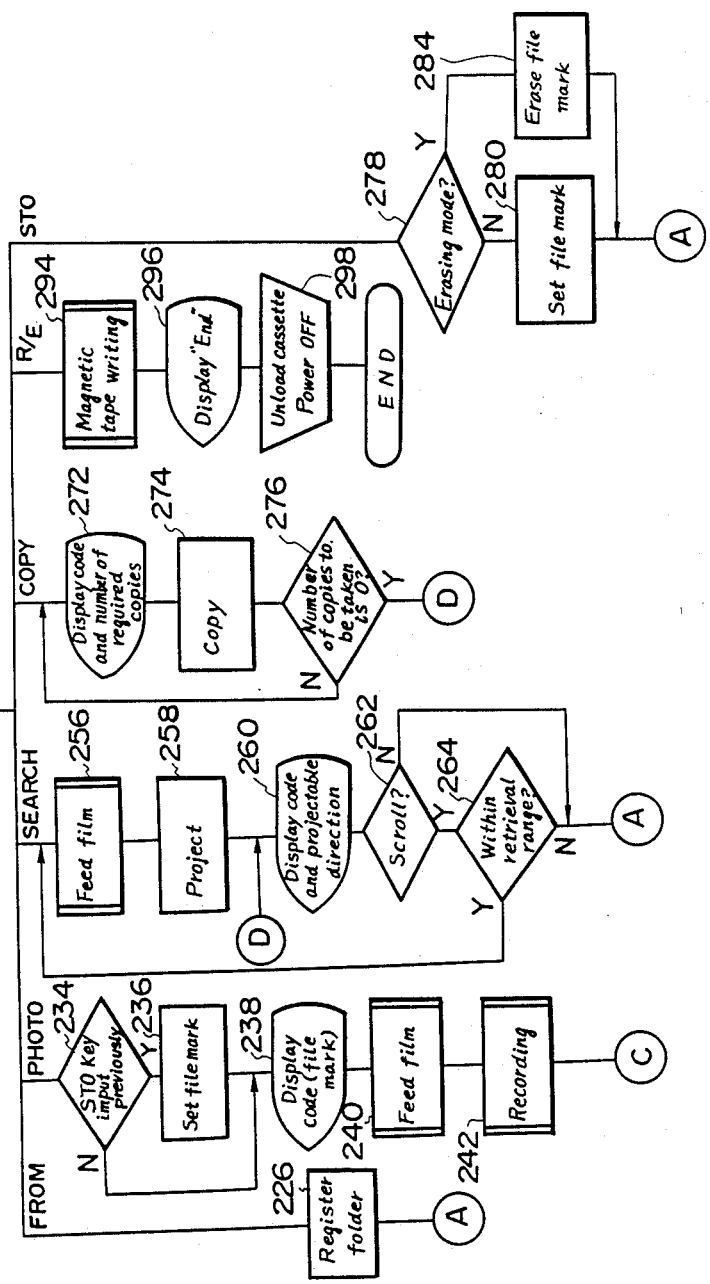

FIG. 7 is a detailed view of the control keyboard 66, and FIGS. 13A to 13C are flowcharts schematically showing processing operations executed by the key input control from the control keyboard 66. Various processing operations will be explained below with reference to FIG. 7.

It should be noted that the term "absolute address" will hereinafter be employed to identify a particular frame on the electrophotographic film 16, the absolute addresses respectively corresponding to the ordinal numbers of the blip marks 21 counted from the end of the film 16 which is closer to the magnetic tape 18. The term "cord" employed in this embodiment means a set of numerals, that is, a superdivision number (folder F), an intermediate-division number (item J) and a sub-division number (page P), which is represented by, for example, "100.2.3". The super-division number is employed to discriminate folders one from the other, and the size or magnitude of the super-division number has no relation with the arrangement order of folders. The intermediate-division and sub-division numbers represent a relative address counted from the top of the folder identified by a particular super-division number. In the above-described example "100.2.3", the code represents the third frame from the top in the second item. Further, "file mark" employed in this embodiment is a mark which consists of a four-digit numeral and which is used to retrieve documents which are related to each other independently of the division numbers.

The relationship between the absolute address, code and file mark will be explained later in detail.

Referring to FIG. 13A, when the power supply is switched on, the work area in the RAM 74 and output signals are initialized (Step 200). In this state, the system is in the retrieval copy mode. When a cassette is loaded into the cassette loading section 90 (Step 202), the cassette loading detector 62 is turned on, and the data recorded on the magnetic tape 18 is read (Step 204) by the microcomputer 68 through the recording and reproducing head 60 and stored in the RAM 74.

[Registration of Folder]

This operation is to register a folder which is identified by the super-division number. For example, when the code "100.5.10" is registered, five items each containing ten pages are prepared in a folder with the number "100".

Accordingly, a folder having a total of 50 pages is prepared.

This will be explained below with reference to FIGS. 13A and 13B. When, a FORM key 100 is pressed in Step 206, the process proceeds through Steps 208, 210, 212 and 214, and the code representing a folder which has already been registered is displayed in Step 216. This display operation is effected by a code display section 102 in the control keyboard 66. When the FORM key 100 is pressed again, the process proceeds from Step 206 to Step 216 in a manner similar to the above, and the code representing another folder which has already been registered is displayed.

Then, in Step 206, numeral keys 104 are actuated to input, for example, the code "100.5.10". In consequence, this code is stored in Step 222 and displayed by the code display section 102 in Step 224. When the FORM key 100 is pressed in Step 206, the process proceeds through Steps 208, 210, 212 and 214 to Step 218, in which the registration mode is set, and the input code is flash-displayed in Step 220. In other words, the operator is asked to check whether or not the displayed code is the one which is to be registered.

Then, the FORM key 100 is pressed again in Step 206. In consequence, the process proceeds through Steps 208 and 210, and the input folder code is registered in Step 226.

Thus, the FORM key 100 serves as both a mode change key and an entry key. The same is the case with the other function keys, as described later. Accordingly, the operation is facilitated, and the control keyboard 66 can be simplified.

When a CLEAR/STOP key 106 is pressed in Step 206, the process proceeds through Step 208, and the registration mode is cleared in Step 228. Then, the code which has been displayed is cleared in Step 224.

[Recording]

The following is a description of an operation of recording the image of a document on the electrophotographic film 16.

In Step 206, a recording area is designated by inputting, for example, the code "100.2". This means that recording is to be effected on the first unexposed or blank page in the item 2 of the folder No. 100. This code is stored in Step 222 and displayed in Step 224.

Then, a PHOTO key 108 is pressed in Step 206. In consequence, the process proceeds through Steps 208, 210 and 212, and the number of blank pages in the item 2 of the folder No. 100 and the first blank page are obtained in Step 228. Then, in Step 230 the operation mode is changed to the recording mode, and a mode display lamp 109 is turned on. Further, the illuminating light soruce 28 is turned on in the weak lighting mode. In Step 232, the code stored in Step 222 and the obtained number of blank pages are respectively flash-displayed on the code display section 102 and the count display section 103.

Then, a document is set, and the PHOTO key 108 is pressed in Step 206. In consequence, the process proceeds through Steps 208, 210 and 234, and the code representing the blank page obtained in Step 228 in the previous control process is displayed on the code display section 102 in Step 238. Then, the film is fed (Step 240) until the portion of the film represented by the above-described code reaches the recording position, and recording is effected (Step 242). The process then proceeds through Steps 228 and 230, and the code concerned and the number of blank pages are flash-displayed in Step 232.

Then, a subsequent document is set, and the PHOTO key 108 is pressed in Step 206. In consequence, Steps 208, 210, 234, 238 to 242 and 228 to 232 are executed in the same manner as the above.

It should be noted that, if the code "100" is input in place of the code "100.2", recording is carried out sequentially from the first unexposed (blank) page in the folder No. 100.

It is possible to put a file mark on a frame which is to be subjected to recording next while the code and the number of blank pages are being flash-displayed as a result of execution of Step 232. This is done in such a manner that a file mark number is input by actuating the numeral keys 104, and a STO key 110 is then pressed.

When, for example, the numeral 20 is input in Step 206, Steps 208, 222 and 224 are executed, and when the STO key 110 is pressed in Step 206, the process proceeds through Steps 208, 210 and 212, and the numeral 20 is defined as file mark number. Then, the file mark sub-mode is set (Step 246), and the code concerned and the input file mark number are flash-displayed (Step 248). The file mark number is displayed on the count display section 103. Then, when the PHOTO key 108 is pressed in Step 206, the process proceeds through Steps 208, 210 and 234, and the input file mark number is set in Step 236. Thereafter, Steps 238 to 242 and 228 to 232 are executed in the same manner as the above.

[Retrieval and Projection]

Retrieval and projection of a page which has already been subjected to recording will be explained below.

The CLEAR/STOP key 106 is first pressed in Step 206, and Steps 208, 228 and 224 are executed, whereby the mode in the previous operation is cleared, and the display on the LED display 64 is cleared.

Then, a retrieval range is designated in Step 206. To retrieve, for example, a page within the item 2 in the folder No. 100, the code "100.2" is input in Step 206. In consequence, Steps 208, 222 and 224 are executed.

Then, either one of the SEARCH keys 112 is pressed in Step 206.

When, for example, the right-hand SEARCH key 114 is pressed, the process proceeds through Steps 208, 210 and 212, and the total number of pages within the retrieval range is obtained in Step 250. Then, the retrieval copy mode is set, and the mode display lamp 117 is turned on (Step 252). The code is flash-displayed in the code display section 102, and the total number of pages within the retrieval range is flash-displayed in the count display section 103 (Step 254). When the total number of pages within the retrieval range is, e.g., 3 in the above-described example, the display is as follows:

100.2.1    3

When the right-hand SEARCH key 114 is pressed again in Step 206, the process proceeds through Steps 208 and 210, and the electrophotographic film 16 is fed until the position represented by the code "100.2.1" reaches the processing position. Then, the designated frame image 22 is projected on the screen 40 (Step 258), and the LED display 64 displays the following code:

100.2.1    [

The symbol "[", which is displayed on the count display section 103, means that there is at least one projectable page in only the direction in which the page number increases (toward the right-hand end of the electrophotographic film 16 shown in FIG. 8). The term "projectable page" in this case means a frame image which has been recorded without any mistake.

When the right-hand SEARCH key 114 in the SEARCH keys 112 is pressed during the image projecting operation, retrieval is effected in the direction in which the page number increases, whereas, when the left-hand SEARCH key 116 is pressed, retrieval is effected in the direction in the the page number decreases.

Then, the process returns to Step 206 from Step 262, and when the right-hand SEARCH key 114 is pressed again in Step 206, the process proceeds through Steps 208 and 210, and the film 16 is fed in Step 256 until a subsequent projectable page coincides with the optical axis 35. Then, the frame image concerned is projected (Step 258), and the LED display 64 displays the following information:

100.2.2    ] [

The symbol "] [" means that there are projectable pages in both rightward and leftward directions from the present position of the film 16 (the position of a frame located at the optical axis 35 shown in FIG. 1).

When the right-hand SEARCH key 114 is pressed again in Step 206, Steps 208, 210 and 256 to 260 are executed in the same manner as the above, and the LED display 64 displays the following information:

100.2.3    ]

The symbol "]" means that there is at least one projectable page only in the direction in which the page number decreases.

It should be noted that, when the SEARCH key 112 is continuously pressed longer than a predetermined period of time in Step 206, scrolling is effected. More specifically, the process proceeds from Step 260 to Steps 262 and 264, and if the retrieved position is still within the retrieval range, the execution of Steps 256 to 260 is repeated at a predetermined interval of time, and projection of frame images and display of information on the LED display 64 are successively carried out. This will be explained later in detail.

The following is a description of the operation in which retrieval and projection are effected using file marks.

The CLEAR/STOP key 106 is pressed to clear the display from the LED display 64 in the same manner as the above. Then, a file mark number is input by actuating the numeral keys 104. In consequence, Steps 222 and 224 are executed.

Then, an RCL key 120 is pressed to designate that the input numeral is a file mark number. More specifically, the process proceeds through Steps 208, 210, 212, 266 and 268, and the input numeral is recognized as a file mark recall number. Then, this file mark number is displayed on the count display section 103 (Step 270), and the process returns to Step 206.

Then, a SEARCH key 112 is pressed. In consequence, the same processing as that in the case where no file mark is put is executed except that the object of retrieval is any projectable page having the file mark coincident with the input file mark recall number rather than a retrieval range designated by a code consisting of folder, item and page numbers.

The following is a description of a retrieval and projecting operation in which a retrieval range is designated by a code consisting of folder, item and page numbers and only a page which is within the retrieval range and which has a designated file mark is retrieved and projected.

The CLEAR/STOP key 106 is pressed to clear the display from the LED display 64 in the same manner as the above. Then, a file mark number is input by actuating the numeral keys 104. In consequence, Steps 222 and 224 are executed.

Then, the RCL key 120 is pressed to designate that the input numeral is a file mark number. More specifically, the process proceeds through Steps 208 to 212 and 266, and the input numeral is recognized as a file mark recall number in Step 268. Then, this file mark number is displayed on the count display section 103 (Step 270), and the process returns to Step 206.

Then, a retrieval range is designated in Step 206. For example, the code "100.2" is input. In consequence, Steps 222 and 224 are executed, and the code "100.2" is displayed on the code display section 102.

When the right-hand SEARCH key 114 is pressed in Step 206, Steps 208 to 212 and 250 to 254 are executed. When the right-hand SEARCH key 114 is pressed again in Step 206, the process proceeds through Steps 218 and 210, and the electrophotographic film 16 is fed in Step 256 until the first page which is within the retrieval range and whose file mark number is 20 is coincident with the projecting position. Thereafter, the same processing as that in the case where no file mark is put is executed except that only a page which is within the retrieval range and which has the file mark is retrieved.

It should be noted that the retrieval operation will be explained later in detail.

[Copying]

The following is a description of an operation conducted in the case where a retrieved page is copied.

It is assumed that, for example, the page which is represented by the code "100.2.2" is being projected. A number of required copies is first input by actuating the numeral keys 104. In consequence, Steps 222 and 224 are executed. When a COPY key 122 is pressed, the process proceeds through Steps 206 to 210, and the code "100.2.2" and the number of required copies are displayed in Step 272. When the number of required copies is, for example, two, "C2" is displayed on the count display section 103. Then, copying is effected (Step 274), and when the number of copies which are to be taken is not 0 (Step 276), the execution of Steps 272 and 274 is repeated. When the copying operation is completed, the process proceeds to Step 260, in which the code and the projectable direction are displayed on the LED display 64. The process then returns to Step 206 from Step 262. It should be noted that, when the COPY key 122 alone is pressed in place of the designation of the number of required copies from the numeral keys 104, only one copy is taken.

When a blank key 118 is pressed to designate the number of required copies, a group copy is carried out. More specifically, when the page represented by the code "100.2.2" is being projected, if the blank key 118 is pressed and the COPY key 122 is then pressed, all the exposed frame images 22 included in the retrieval range "100.2" are copied one for each.

[Change or Erasure of File Mark]

The following is a description of the operation in which a file mark is changed or erased during retrieval.

For example, the numeral 50 is input from the numeral keys 104 when the page represented by the code "100.2.2" is being projected. In consequence, Steps 222 and 224 are executed.

When the STO key 110 is pressed in Step 206, the process proceeds through Steps 208 to 212, and the numeral 50 is recognized to be a file mark number in Step 244. Then, the file mark sub-mode is set (Step 246), and the code "100.2.2" is flash-displayed on the code display section 102, while the file mark number "F50" is flash-displayed on the count display section 103 (Step 248).

When the STO key 110 is pressed again in Step 206, the process proceeds through Steps 208, 210 and 278, and the numeral 50 is set as a file mark in Step 280. In this way, the file mark "50" is set on the frame image 22 represented by the code "100.2.2".

The operation of erasing a file mark will be explained below.

During retrieval, if the RCL key 120 is pressed in Step 206 when, for example, the page represented by the code "100.2.3" is being projected, the process proceeds through Steps 208 to 212 and 266, and the file mark erasing sub-mode is set in Step 282. Then, the code and the file mark (if attached to this code) are displayed on the count display section 103 (Step 270). For example, the display in this case is as follows:

100 2.3     F20

When the STO key 110 is pressed in Step 206, the process proceeds through Steps 208 to 212, 244 and 245, and the code and the file mark number are flash-displayed in Step 248 to ask the operator to check whether or not the displayed file mark number is to be erased.

When the STO key 110 is pressed again in Step 206, the process proceeds through Steps 208, 210 and 278, and the file mark 20 is erased in Step 284.

[Terminating Operation]

The following is a description of the operation carried out after the recording, retrieval, projection or copying operation has been completed.

When an REW/EJECT key 124 is pressed in Step 206, the process proceeds through 208 to 212, and a judgement is made in Step 286 as to whether or not recording has been executed. If YES, the process proceeds to Step 288, in which the latest recorded page is projected on the screen 40 to ask the operator if the cassette is to be unloaded or not. Then, the code concerned is displayed on the code display section 102, and the symbol "End" is displayed on the count display setion 103 (Step 290). Then, the rewind/eject mode is set (Step 292).

When the REW/EJECT key 124 is pressed again in Step 206, the process proceeds through Steps 208 and 210, and the take-up shaft 14 shown in FIG. 1 is rotated counterclockwise in Step 294 to rewind the electrophotographic film 16 and the magnetic tape 18 on the take-up shaft 14.

Then, the take-up shaft 12 is rotated clockwise, and the data concerning the film 16 stored in the RAM 74 is recorded on the magnetic tape 18. Thereafter, the tape 18 is rewound. Then, the process proceeds to Step 296, in which the display on the code display section 102 is cleared, and the symbol "End" is displayed on the count display section 103. The process then proceeds to Step 298, in which the cassette is raised so that it can be unloaded. The operator then unloads the cassette and turns off the power supply. If NO is the answer in Step 286, that is, recording has not been executed, Steps 288 to 290 are not executed, and the process immediately proceeds to Step 292. Thereafter, the same processing as that in the case where recording has been executed is carried out except that no projection processing is executed.

[Frame Data]

The following is a description of a practical arrangement of frame data with reference to FIGS. 9 to 12.

FIG. 9 shows an arrangement of frame data in the case where folders are first registered by inputting the code "100.2.3" and the code "200.3.2" and the folder No. 100 is then expanded by inputting the code "100.3.3". When a registered folder is expanded, an expanded portion is registered in an unregistered area next to the registered area on the electrophotographic film 16. When a mistake occurs during recording due to undesirable turn-off of the power supply or other failures, areas for frames represented by the codes corresponding to those which represent defective frames are ensured on the film 16 in the reverse direction from the last frame position on the film 16. In the example shown in FIG. 9, a recording mistake occurs at the position represented by the code "100.2.2", and the frame represented by this code is recorded on the 1000th frame position, which is the last frame position on the film 16.

Recording can be effected on the electrophotographic film 16 at random, that is, the order in which frames are arranged on the film 16 can be ignored, by designating a code for each frame.

In retrieval, when, for example, the code "200" is input, the frame images 22 having the absolute addresses 7 to 10, respectively, can be retrieved, as will be clear from FIG. 9, and these frames can be sequentailly projected by pressing the right-hand SEARCH key 114. When the code "100.2" is input, the frame images 22 having the absolute addresses 4 and 1000, respectively, can be retrieved. When retrieval is effected using the file mark 10, the frame images 22 having the absolute addresses 1 and 7, respectively, can be projected. When retrieval is effected using the file mark 20, the frame images 22 having the absolute addresses 3 and 8, respectively, can be projected.

The operation carried out when copies are taken is similar to that in the case of projecting frame images 22.

FIGS. 10A and 11 correspond to FIG. 9. FIG. 10A is a folder table in which folder numbers are arranged in order of registration. FIG. 11 is an address table in which the frames on the electrophotographic film 16 are arranged in order of code, unlike the table shown in FIG. 9 in which the frames are arranged in order of absolute address.

Figure 12:
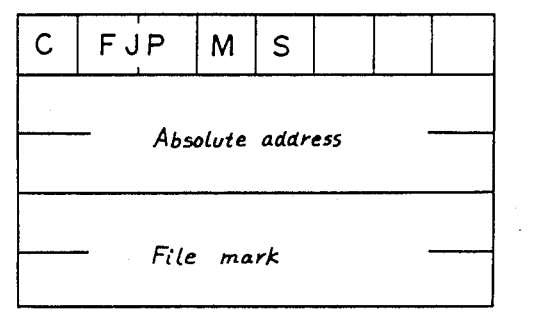

As shown in FIG. 12, the discrimination between F, J and P is effected by two bits (division FJP) in each status byte. When FJP is 3, 2, 1 or 0, this represents F, J, P or END mark, respectively.

Each absolute address is represented by two bytes. The status byte also includes a recording completion flag C (when recording has been completed, the flag C is set, i.e., "1") and a recording mistake flag M (when a recording mistake occurs, the flag M is set, i.e., "1"). In addition, two bytes are ensured for a file mark for each frame. These five bytes are ensured for each of the frame images 22.

Since the division FJP is represented by two bits, the storage capacity can be minimized.

[Method of Obtaining Absolute Address]

The method of obtaining an absolute address from the corresponding code will be explained below with reference to FIGS. 10A and 11.

In the case of, for example, the code "100.1.3", since FIG. 10A shows that the folder No. 100 is the first folder, the first F is searched in FIG. 11. The folder F involves both the item J and the page P, and the number of "P"s is therefore counted to two rightward from the first F ("100.1.1"). The absolute address of this position is 3. In this way, the absolute address represented by the code "100.1.3" is found to be 3.

In the case of, for example, the code "200.2.2", since FIG. 10A shows that the folder No. 200 is the second folder, the second F from the left in FIG. 11 is searched. The folder F involves both the item J and the page P, and the item J involves the page P. Therefore, the first J ("200.2.1") which is located to the right of the second F ("200.1.1") is searched, and the first P which is located to the right of the first J is further searched. The absolute address of this position is 10. In this way, the absolute address represented by the code "200.2.2" is found to be 10.

Figure 14A:
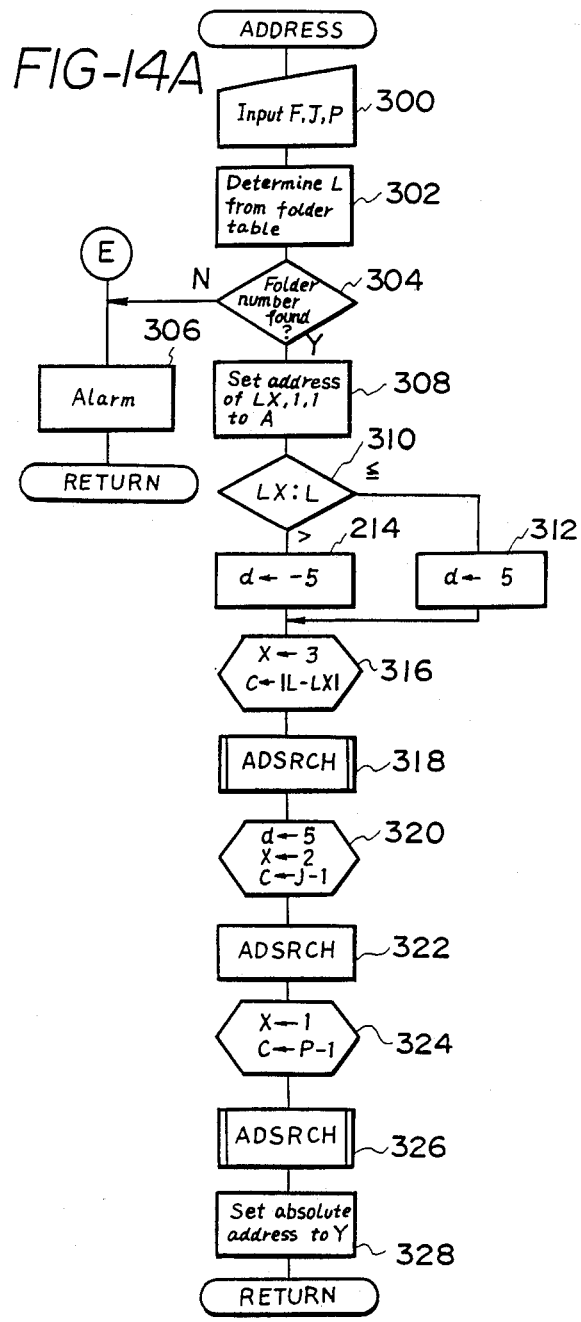
FIGS. 14A and 14B are flowcharts for obtaining an absolute address of a target position from a present position when a code representing a target position is input.
Figure 14B:
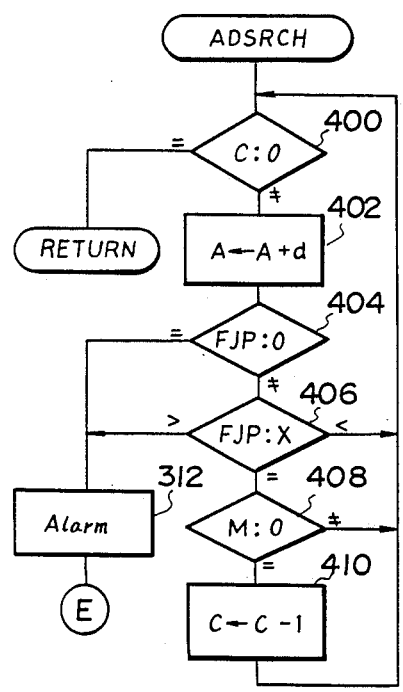

The method of obtaining the absolute address of a target position (hereinafter referrred to as the "target absolute address") on the basis of the present position (the absolute address of the present position will hereinafter be referred to as the "present absolute address") of the electrophotographic film 16 will be explained below in detail with reference to FIGS. 14A and 14B.

It is assumed in the following description that the present position is represented by the code "100.1.3" (see ① in FIG. 11) and the target position is represented by the code "200.2.2" (see ⑤ in FIG. 11).

The code "200.2.2" representing the target position is input in Step 300. Then, the ordinal number of this folder No. 200 is obtained from the folder table shown in FIG. 10A. In this example, the folder No. 200 is the second folder, and the value for L is determined to be 2 (Step 302). If the folder number concerned is not found in the folder table (Step 304), warning is given to the operator (Step 306), and the process returns to the main routine.

Then, the address A on the memory of the reference position ("100.1.1") of the folder to which the present position belongs is obtained (Step 308). This is done for the purpose of simplifying the program by systematically handling the data concerning the target position whether or not the target position is in the same folder as the present position, as will be understood from the description below. In Step 308, the value of LX is the value for L of the present position, and it is 1 in this example. The value for A is obtained as the address of the position of the first F which is located to the left of the position ① in FIG. 11. Accordingly, the value for A is 0. Since the condition of LX<L is acknowledged in Step 310, 5 is set as the value for d (Step 312). The value for this d is based on the fact that frame data for each frame image 22 consists of 5 bytes as shown in FIG. 12. Then, the values for X and C which are employed in the subroutine shown in FIG. 14B are determined in Step 316.

The value for X is 3, 2 or 1 when the FJP is F, J or P, respectively. The value for C is 1 in this example, and this means to obtain the position ③ of the first F to the right of the position ② in FIG. 11 as will be described later. Then, the subroutine shown in FIG. 14B is executed in Step 318.

Since the value of C is 1, the process proceeds from Step 400 to Step 402, in which the value (=5) of d is added to the value for the address A on the memory. The symbol for FJP shown in FIG. 12 at the renewed address A is found to be P from FIG. 11, and FJP is therefore 1. Accordingly, the process proceeds from Step 404 to Step 406. Since the value of X is 3 and consequently FJP<X, the process returns to Step 400. When the execution of Steps 400 to 406 is repeated ten times, the position of ③ in FIG. 11 is reached. Consequently, the value of FJP is acknowledged to be 3 in Step 406, and the process proceeds to Step 408. As shown in FIG. 9, the frame image 22 represented by the code "200.1.1" has no recording mistake, and the value of M is therefore 0. Accordingly, the process proceeds to Step 410, in which the value of C is decremented by 1 so as to be 0, and the process returns to Step 400 and then returns to the routine shown in FIG. 14A.

Then, 5, 2 and J−1 are respectively set as the values for d, X and C in Step 320. Since J is 2, the value of C is 1. Then, the subroutine shown in FIG. 14B is executed in Step 322. When the execution of Steps 400 t 406 is repeated twice in the same manner as the above, the position ④ shown in FIG. 11 is reached, so that the value of FJP is acknowledged to be 2 in Step 406, and the process then proceeds to Step 408. The frame image 22 at the position represented by the code "200.2.1" has no recording mistake as will be clear from FIG. 9, and M=0 is acknowledged in Step 408. The process therefore proceeds to Step 410, in which the value of C is decremented by 1. In consequence, the value of C becomes 0, and the process returns to Step 400 and then returns to the routine shown in FIG. 14A.

Then, 1 and P−1 are respectively set as the values for X and C in Step 324. Since the value of P is 2, the value of C is 1. Then, the subroutine shown in FIG. 14B is executed in Step 326. When the execution of Steps 400 to 406 is carried out once in the same manner as the above, the value of FJP becomes 1, and the process therefore proceeds to Step 408. Since the condition of M=0 is met at this position as will be understood from FIG. 9, the process proceeds to Step 410, in which the value of C is decremented by 1. In consequence, the value of C becomes 0, and the process returns to Step 400 and then returns to the main routine.

Then, the absolute address (see FIG. 12) stored at the addresses A+1 and A+2 is set as the value for Y in Step 328. Thus, the value of Y is 10. The process then returns to the main routine.

In this way, the absolute address of the target position represented by the code "200.2.2" is obtained as the value of Y.

The method of obtaining the absolute address of a target position which is in the same folder as the present position will be explained below.

It is assumed that the present position is "100.2.2" (the absolute address 100) and the target position is "100.1.3". The execution of Steps 300 to 308 is carried out in the same manner as the above, and searching is effected until the first F which is located to the left of the position ③ in FIG. 11 is found. The first F is found at the position ②, and the value of the address A on the memory is obtained (A=0). Then, the process proceeds to Step 316 through Steps 310 and 312. Both the values of L and LX are 1, and the value of C is therefore 0. Accordingly, even when the subroutine shown in FIG. 14B is executed in Step 318, the process returns from Step 400 to the routine shown in FIG. 14A and proceeds to Step 320. This is because the position ② and the target position ① are in the same folder. In Step 320, 0 is set as the value for C, and the process therefore returns from Step 400 and proceeds to Step 324 in the same manner as the above. This is because the position ② and the target position ① are in the same item. Then, 2 is set as the value for C in Step 324. In consequence, the execution of Steps 400 to 410 is repeated twice, and the process returns to the routine shown in FIG. 14A. Then, 3 is set as the value for Y in Step 328, and the process then returns to the main routine.

Thus, it is possible to obtain the absolute address of a target position by the same processing method whether or not the target position is in the same folder as the present position.

The feed of the electrophotographic film 16 from th present position to the target position is carried out in the following manner.

The difference between the absolute address of the target position, obtained as detailed above, and the absolute address of the present position, which has already been obtained, is calculated, and whether the film 16 is to be fed rightward or leftward is determined in accordance with the sign of the difference therebetween. Then, the film 16 is fed, and the feed of the film 16 is stopped when the number of blip marks 21 counted up reaches the absolute value of said difference. Thus, the frame at the target position is fed to the position of the optical axis 35.

Figure 15:
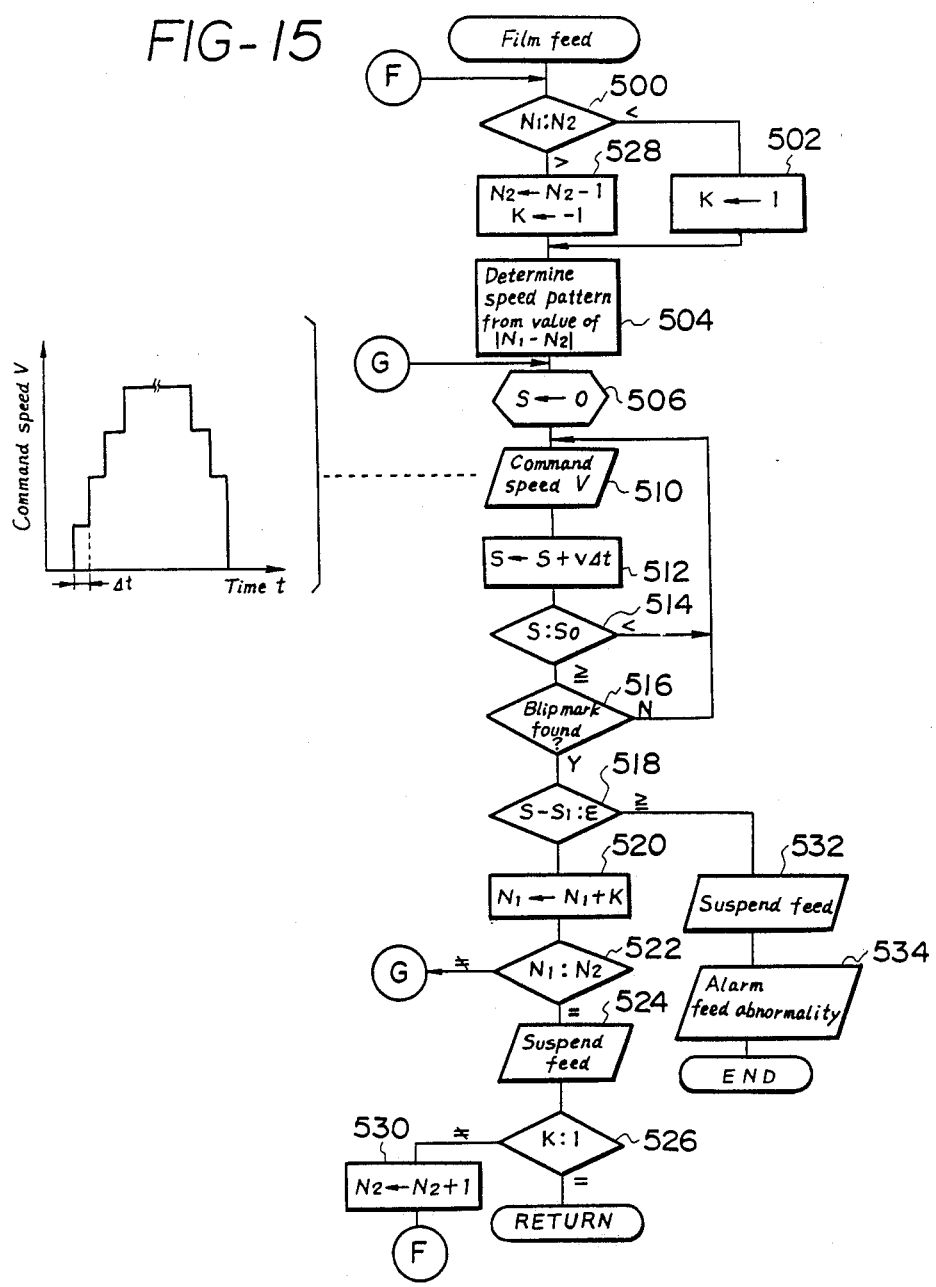
FIG. 15 is a flowchart showing a film feed operation.

The film feed operation carried out in Step 240 shown in FIG. 13C will be explained below in detail with reference to FIG. 15.

It is assumed that the electrophotographic film 16 is to be fed from a present position (absolute address $N_1$) to a target position (absolute address $N_2$). As shown in FIG. 8, the distance between each pair of adjacent blip marks 21 is represented by $S_1$, and the distance through which no detection of blip marks is carried out is represented by $S_0$. The relationship between these two distances is $S_0 < S_1$. Further, the command speed for the film feed is represented by V. A voltage which is to be supplied to either the motor 48 or 50 is determined on the basis of the command speed V and the roll diameter of the tape 10. The value of the command speed V integrated with time is represented by S.

In this embodiment, when $N_1 > N_2$, that is, when the film 16 is to be rewound, the film 16 is rewound up to the address $N_1 - 1$, and then, the film 16 is unwound by an amount corresponding to one frame, thereby allowing rewinding and unwinding operations to be carried out under the same mechanical conditions such as inertial condition, and thus increasing the degree of accuracy in suspending the feed of the film 16.

The film feed operation carried out in the case of $N_1 < N_2$ will first be explained.

In this case, the process proceeds from Step 500 to Step 502, in which the value of K is set at 1 in order to increment the value of $N_1$. Then, the process proceeds to Step 504, in which a speed pattern for the command speed V is determined. The greater the value of $|N_1 - N_2|$, the faster the film 16 is to be fed. Speed patterns are stored in the form of a table in the ROM 72 in advance, the command speed V changing in steps as shown in FIG. 15.

Then, the value S is cleared in Step 506. The process then proceeds to Step 510, in which the motor 48 is supplied with a voltage determined on the basis of the command speed V and the roll diameter of the film 16 (determined by the value of $N_1$). The process then proceeds to Step 512, in which the value of the film feed distance S is renewed. If $S < S_0$ (Step 514), the process returns to Step 510, and the above-described processing is repeated. In other words, when $S < S_0$, no judgement is made as to whether or not there is a blip mark 21. Thus, even when dust is attached to the surface of the film 16, there is no fear of it being erroneously judged to be a blip mark 21. It is necessary, in order to increase the degree of accuracy in stopping the film 16, to suspend the feed of the film 16 at the same time as the edge at the leading end of a blip mark 21 is detected, and there is therefore no sufficient time to discriminate dust and a blip mark 21 from each other. Accordingly, it is considerably effective practice to stop reading any signal from the light-receiving element 56 while $S < S_0$.

During the above-described repetition of processing, the value of V in Step 512 is renewed in accordance with the speed pattern determined in Step 504.

When $S \geq S_0$, the process proceeds to Step 516, in which a signal delivered from the light-receiving element 56 is read to make a judgement as to whether or not there is a blip mark 21. When no blip mark 21 is detected, the process returns to Step 510, and the processing of Steps 510 to 516 is repeated.

When a blip mark 21 is detected, the process proceeds to Step 518, in which existence of any abnormality in feed of the film 16 is detected on the basis of the value of $|S - S_1|$. When $|S - S_1| < \epsilon$, it is judged that the film 16 has been fed without any error, and $N_1$ is incremented in Step 520. If $N_1 = N_2$ in Step 522, the process returns to Step 506, and the above-described processing is repeated to count the number of blip marks 21.

When $N_1 \neq N_2$ in Step 522, the feed of the film 16 is suspended in Step 524. Since $K=1$ in Step 526, the process returns to the main routine.

The film feed operation carried out in the case of $N_1 > N_2$ will next be explained.

In this case, the process proceeds from Step 500 to Step 528, in which the value of $N_2$ is decremented. In consequence, the feed of the film 16 is suspended in Step 524 after it has been rewound excessively by an amount corresponding to one frame. Further, the value of K is set at $-1$, and the value of $N_1$ is decremented in Step 520.

After the feed of the film 16 has been suspended in Step 524, the process proceeds through Step 526 to Step 530, in which the value of $N_2$ is incremented, and the process returns to Step 500. Since $N_2 = N_1 + 1$, the same processing as the above-described one which is executed in the case of $N_1 < N_2$ is carried out to feed the film 16 by an amount corresponding to one frame.

When $|S - S_1| \geq \epsilon$ in Step 518, the feed of the film 16 is udged to be abnormal or erroneous, and the feed of the film 16 is suspended in Step 532. Then, feed abnormality is displayed in Step 534 and an alarm such as a buzzer is sounded to inform the operator of the existence of abnormality, thus completing the processing. After the feed of the film 16 has been normalized by the operator, the processing is resumed.

Thus, every time the film 16 is fed by an amount corresponding to one frame, the detection of existence of any feed abnormality is carried out, and it is therefore possible to find abnormality in the film feed operation such as jamming in an early stage and thereby to prevent the film 16 from becoming defective.

Figure 16:
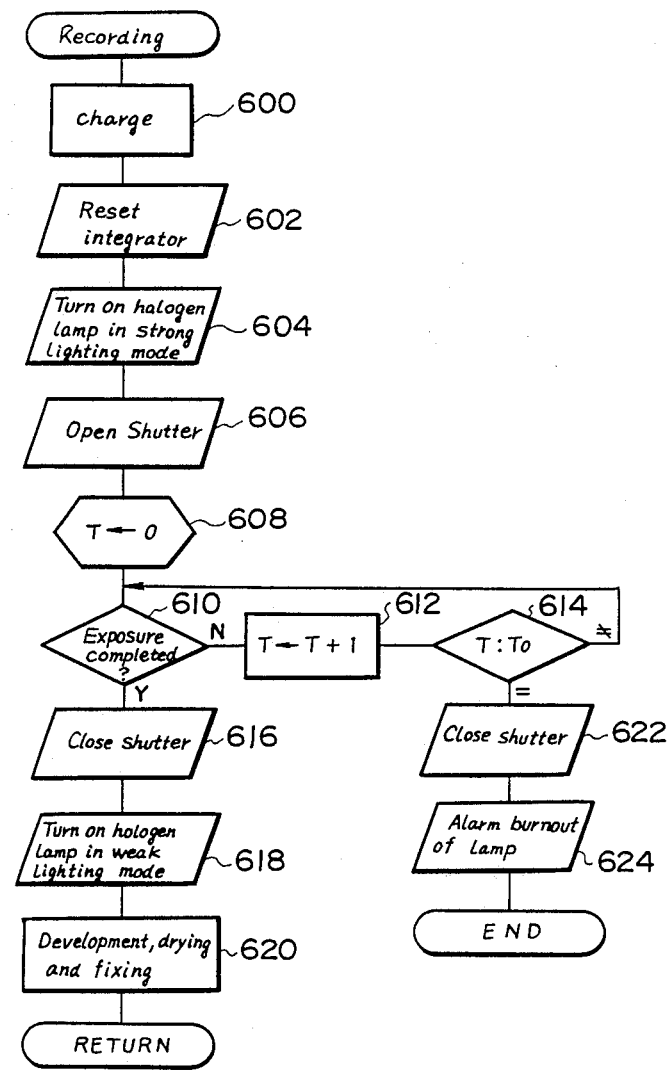
FIG. 16 is a flowchart showing a recording operation.

The recording operation carried out in Step 242 shown in FIG. 13C will be explained below in detail with reference to FIG. 16.

The electrophotographic film 16 is uniformly charged positive by means of corona discharge in Step 600. Then, the process proceeds to Step 602, in which the integrator 134 shown in FIG. 3 is reset, and the strong lighting signal SL shown in FIG. 4 is raised to the H level in Step 604 to light up the illuminating light source 28 shown in FIG. 1 in the strong lighting mode. Then, the shutter 47 is opened in Step 606.

Then, the value of T which defines a soft timer is cleared in Step 608. When the output of the comparator 136 shown in FIG. 3 is at the L level in Step 610, the value of T is incremented in Step 612. When the value of T has not yet reached $T_0$ in Step 614, the processing of Steps 610 to 614 is repeated. The value of $T_0$ corresponds to a period of time which is slightly longer than the exposure time set in the case of recording black paper. Accordingly, unless the illuminating light source 28 has burnt out, the output of the comparator 136 is raised to the H level in Step 610 before the condition of $T=T_0$ is reached, and the process consequently proceeds to Step 616, in which the shutter 47 is closed. In Step 618, the strong lighting signal SL is changed to the L level, while the weak lighting signal WL is raised to the H level to change the operating mode of the illuminating light source 28 to the weak lighting mode. In this way, exposure processing is executed in Steps 602 to 618. Then, development, drying and fixing operations are carried out in Step 620, and the process then returns to the main routine.

FIG. 5C shows a time chart of the lighting control of the illuminating light soruce 28 in the recording mode. The reason why the light source 28 is not turned off but kept turned on in the weak lighting mode during the time when the shutter 47 is closed is to ensure the halogen cycle in order to prevent consumption of the filament and blackening of the tube wall of the illuminating light source (halogen lamp) 28 and to maintain the color temperature at a constant level.

When the lamp, constituting the illuminating light source 28, has burnt out, the condition of $T = T_0$ is reached in Step 614 while the processing of Steps 610 to 614 is repeated, and the process then proceeds to Step 622, in which the shutter 47 is closed, and the burnout of the lamp is displayed and an alarm such as a buzzer is sounded to inform the operator of the burnout of the lamp in Step 624, thus completing the processing.

In this way, the burnout of the lamp of the illuminating light source 28 can be detected simply by adding Steps 608, 612 and 614. The arrangement may be such that a counter is provided to count the number of clock pulses while the shutter 47 is open, and when the count of the counter reaches a predetermined value, the lamp is judged to be burnt out.

The fixing operation, which is a part of the processing executed in Step 620 shown in FIG. 16, will be explained below with reference to FIG. 17.

Flashlight is emitted from the xenon lamp 2460 in Step 650, and a judgement is made in Step 652 as to whether or not the light-receiving element 2460A has received this light. If YES, the fixing processing is completed. If NO is the answer in Step 652, the burnout of the lamp 2460 is displayed and an alarm such as a buzzer is sounded to inform the operator of the burnout of the lamp 2460 in Step 654. Then, the process proceeds to Step 656, in which the fact that the frame concerned is an unfixed frame is stored in the RAM 74. This data storing operation is carried out by storing the address of an unfixed frame in a specific region as shown in FIG. 10B. The illustrated example shows that the frames whose adresses are 4 and 15 are unfixed. Since the number of unfixed frames is generally small, it suffices to provide a relatively small storage region.

It should be noted that the storag of data concerning an unfixed frame may be effected by setting one bit in the status byte shown in FIG. 12.

Fixing of an unfixed frame will be explained later.

An interrupt processing executed when an abnormality occurs in the power supply will be described below with reference to FIG. 18A.

Processing is started when the input port 76 is supplied with the non-maskable interrupt signal $\overline{NMI}$ from the power interruption detecting circuit 53. In Step 700, the contents of the registers (including the program counter) are shunted so as to be used when the fixing operation is restarted. The process then proceeds to Step 702, in which, if it is judged that processing of Step 650 has not yet been completed due to a power failure, the process proceeds to Step 704, in which the address of the unfixed frame concerned is stored in the RAM 74 in a manner similar to that in the case of burnout of the lamp described above.

Processing executed when the power supply is restored to a normal state will be explained below with reference to FIG. 18B If it is judged in Step 730 that the address of an unfixed frame has been stored in the RAM 74, the frame concerned is fixed in Step 732. The shunted contents of the registers (including the program counter) are reset in Step 734. Then, the processing is resumed from Step during which the power supply abnormality occurred.

The fixing operation carried out in Step 732 will be explained below in detail with reference to FIG. 18C.

In Step 760, the electrophotographic film 16 is fed to the position of an unfixed frame whose address has been stored in the RAM 74. The process then proceeds to Step 762, in which flashlight is emitted from the xenon lamp 2460, and a judgement is made in Step 764 as to whether or not the light-receiving element 2460A has received this light. If YES, it means that the fixing has been completed, and the address of the unfixed frame concerned is cleared in Step 766. The process then proceeds to Step 768, and if there is another unfixed frame whose address has been stored in the RAM 74, the processing of Steps 760 to 768 is repeated.

Figure 17:
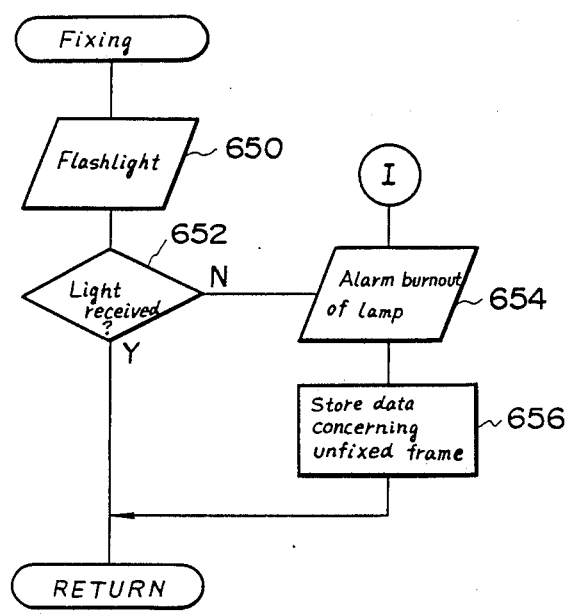
FIG. 17 is a flowchart showing a fixing operation.

If it is judged in Step 764 that no light has been received by the light-receiving element 2460A, the processing of Steps 654 to 656 shown in FIG. 17 is executed.

The magnetic tape reading operation executed in Step 204 shown in FIG. 13A will be explained below in detail with reference to FIG. 19.

In Step 800, the magnetic tape 18 is fed at low speed (reading speed) leftward as viewed in FIG. 8. The timer T is cleared in Step 802. The process then proceeds to Step 804, in which a judgement is made as to whether or not the light emitted from the light-emitting element 55 has been received by the light-receiving element 56. If the leader tape 19 is present between the light-emitting and -receiving elements 55 and 56, the light emitted from the element 55 is received by the element 56, and T is incremented in Step 808. If $T \leq T_0$ in Step 810, the processing of Steps 804 to 810 is repeated.

Accordingly, when a transparent portion has been fed fed through a predetermined distance, the condition of $T=T_0$ is reached in Step 810, and the leader tape 19 is acknowledged. The process then proceeds to Step 812.

If the light is intercepted in Step 804, it means that either the magnetic tape 18 or a blip mark 21 is detected. Therefore, the process proceeds to Step 806, in which the tape 10 is fed at high speed rightward as viewed in FIG. 8 until the intermediate portion of the leader tape 19 faces the erasing head 58, and the tape 10 is then fed leftward at low speed.

If the light emitted from the light-emitting element 55 is intercepted by the magnetic tape 18 in Step 812, data is read from the magnetic tape 18 by means of the erasing head 58 in Step 814. When data representing an end mark is read, the magnetic tape 18 is fed at high speed in the same direction, i.e., in the leftward direction, in Step 816. The tape 10 is continuously fed in Step 818 until the electrophotographic film 16 is present between the light-emitting and -receiving elements 55 and 56, and a judgement is made in Step 820 as to whether or not there is any unfixed frame. This operation is carried out by making a judgement as to whether or not the data which has been written on the magnetic tape 18 in Step 924 (described later) and read into the RAM 74 in Step 814 includes an address such as that shown in FIG. 10B.

When there is no unfixed frame, $N_0$ blip marks 21 are counted in Step 822, and the process then proceeds to Step 824, in which the high-speed feed which has been started in Step 816 is suspended. The first frame $(N_0-1)$ is a non-used frame, and the $N_0$-th frame has the absolute address 1.

If there is any unfixed frame, processing shown in FIG. 18C is executed in Step 826. When the processing of either Step 824 or 826 has been completed, the process returns to the main routine.

Thus, since the leader tape 19 is spliced to one end of the magnetic tape 18, it is possible to find the read starting position without the need to stick aluminum foil to the tape 18 and detect it.

Figure 20A:
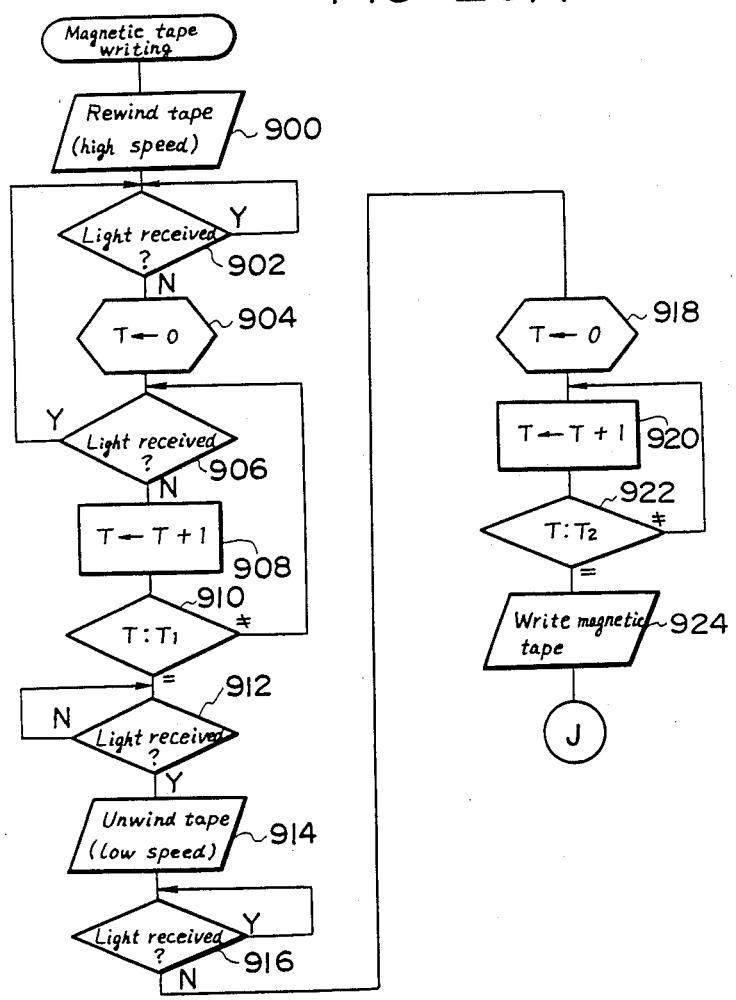
FIG. 20A and FIG. 20B are flowcharts showing a magnetic tape writing operation.
Figure 20B:
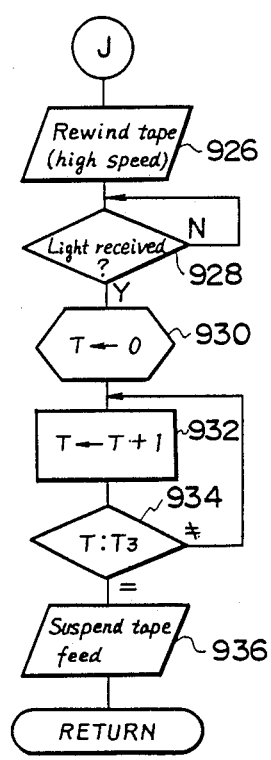

The magnetic tape writing operation executed in Step 294 shown in FIG. 13C will be explained below in detail with reference to FIGS. 20A and 20B.

In Step 900, the tape 10 is started to be fed at high speed rightward as viewed in FIG. 8. When the electrophotographic film 16 is present between the light-emitting and -receiving elements 55 and 56 and the light emitted from the element 55 is intercepted by a blip mark 21, the process proceeds from Step 902 to Step 904, in which the timer T is cleared. Then, the process proceeds through Step 906 to Step 908, in which the T is incremented. Since $T \neq T_1$ in Step 910, the processing of Steps 906 to 910 is repeated. Since the width of each blip mark 21 is small, Step 902 is looped until a subsequent blip mark 21 is detected after the light from the light-emitting element 55 has been received by the light-receiving element 56 in Step 906.

When the magnetic tape 18 is present between the light-emitting and -receiving elements 55 and 56 while the tape 10 is being fed, the processing of Steps 906 to 910 is repeated $T_1$ times, and the process then proceeds to Step 912. When the leader tape 19 is detected in Step 912, the process proceeds to Step 914, in which the tape 10 is fed at low speed leftward as viewed in FIG. 8. Then, the process proceeds to Step 916, and when the magnetic tape 18 is detected, the timer T is cleared in Step 918. Then, counting is performed until T reaches $T_2$ in Steps 920 and 922, that is, the feed of the tape 10 is continued until the writing start position of the magnetic tape 18 is reached. Then, frame data is written on the magnetic tape 18 in Step 924. The frame data includes the address of any unfixed frame.

When the writing operation is completed, the process proceeds to Step 926, in which the tape 10 is fed at high speed rightward as viewed in FIG. 8. Then, the process proceeds to Step 928, in which a judgement is made as to whether or not the leader tape 19 is present between the light-emitting and -receiving elements 55 and 56. If YES, the timer T is cleared in Step 930. Then, counting is performed in Steps 932 and 934 until T reaches $T_3$, that is, the feed of the tape 10 is continued until the intermediate portion of the leader tape 19 is reached. Then, in Step 936, the rewinding of the tape 10 which has been started in Step 926 is stopped. The process then returns to the main routine.

Thus, since the leader tape 19 is spliced to one end of the magnetic tape 18, it is possible to find the writing start position without the need to stick aluminum foil to the tape 18 and detect it.

It should be noted that, although in the above-described embodiment the image data processing system to which the present invention is applied is a camera processor reader printer for microfilm, the present invention may be widely applied to any type of mono-functional or multifunctional system which effects projection, display, retrieval and recording of image data, for example, a system which projects image data on a screen, a system which displays image data on a CRT, or a system which records image data on a recording medium such as a film or a disk.

Although an electrophotographic film has been described as an example of a film for recording image data or a film having image data recorded thereon, this is not necessarily limitative, and it is also possible to employ conventional films, such as silver halide film, thermoplastic film, photomigration type thermal developing film, and thermal developing type silver halide film. In addition, the magnetic tape which is spliced to the leading end of the electrophotographic film may be replaced with a storage medium such as a semiconductor memory.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A frame position determining method comprising the steps of:

moving a film in its longitudinal direction, said film having blip marks provided thereon for respective frames in advance; and detecting blip marks to determine the position of a particular frame on said film in such a manner that no detection of blip marks is effected during a period of time which begins immediately after the leading end edge of a blip mark has been detected and which ends slightly before the time at which the leading end edge of a subsequent blip mark is expected to be detected.

2. A frame position determining method according to claim 1, wherein said film is defined by an image data recording medium composed of a transparent leader tape, an opaque magnetic tape for recording frame data and a transparent continuous film for recording a frame image, which are spliced together successively in that order.

3. A frame position determining method according to claim 1, wherein said period of time during which no detection of blip marks is effected is defined by a detection inhibition distance which is slightly shorter than the distance between the respective edges of each pair of adjacent blip marks, said edges being on the same side of the two blip marks, so that no detection of blip marks is effected when a distance through which said film has been fed from a position relative to a reference edge of a blip mark is shorter than said detection inhibition distance.

4. A frame position determining method according to claim 3, wherein a distance through which said film is to be fed is calculated on the basis of the product of a film feed command speed obtained in accordance with a speed pattern and time, said speed pattern being determined by the absolute value of a difference between a present position of said film and a target position thereof.

5. A frame position determining method according to claim 3, wherein after said subsequent blip mark has been detected, a judgement is made as to whether or not said film has been fed in a normal state by detecting whether or not any feed error is within a predetermined range, and when any abnormality is found in the feed of said film, the film feed operation is suspended and feed abnormality is displayed, whereas, when no abnormality is found, a judgement is made as to whether or not a present position of said film is coincident with a target position, and when the two positions are coincident with each other, the film feed operation is suspended.

6. A frame position determining method according to claim 5, wherein a difference between the distance through which said film has been fed and the distance between said respective edges of the two adjacent blip marks is calculated, and when the absolute value of the obtained difference is smaller than a predetermind value, the film feed is judged to be normal, whereas, when said absolute value exceeds the predetermined value, the film feed is judged to be abnormal.

7. A frame position determining method according to claim 1, wherein whether said film is to be unwound or rewound is determined in accordance with the sign of the difference between an address representing a present position of said film and an address representing a target position of said film.

8. A frame position determining apparatus comprising:

film feed means rotating two reels having a film wound thereon, said film having blip marks provided thereon at a predetermined regular spacing;

a photosensor defined by a combination of light-emitting and -receiving elements disposed so as to face each other across said film; and means for determining the position of a particular frame by detecting blip marks through said photosensor in such a manner that no detection of blip marks is effected during a period of time which begins immediately after the leading end edge of a blip mark has been detected and which ends slightly before the time at which the leading end edge of a subsequent blip mark is expected to be detected.

9. A frame position determining apparatus according to claim 8, wherein said film is defined by an image data recording medium composed of a transparent leader tape, an opaque magnetic tape for recording frame data and a tansparent continuous film for recording a frame image, which are spliced together successively in that order, said blip marks being provided on said continuous film.

10. A frame position determining apparatus according to claim 9, wherein said transparent leader tape is rigidly secured to one of said two reels, and said continuous film is rigidly secured to the other reel.

* * * * *